(12) United States Patent
Imai et al.

(10) Patent No.: US 9,451,248 B2
(45) Date of Patent: Sep. 20, 2016

(54) DATA PROCESSING DEVICE AND DATA PROCESSING METHOD

(71) Applicant: PANASONIC CORPORATION, Osaka (JP)

(72) Inventors: Tomohiro Imai, Kanagawa (JP); Yuko Otsu, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 459 days.

(21) Appl. No.: 14/131,441

(22) PCT Filed: Sep. 27, 2012

(86) PCT No.: PCT/JP2012/006200
§ 371 (c)(1),
(2) Date: Jan. 8, 2014

(87) PCT Pub. No.: WO2013/046698
PCT Pub. Date: Apr. 4, 2013

(65) Prior Publication Data
US 2014/0153637 A1    Jun. 5, 2014

(30) Foreign Application Priority Data

Sep. 28, 2011    (JP) ................. 2011-212916

(51) Int. Cl.
*H04N 19/00*   (2014.01)
*H04N 19/115*  (2014.01)
*H04L 1/00*    (2006.01)
*H04L 1/18*    (2006.01)
*H04N 21/236*  (2011.01)
(Continued)

(52) U.S. Cl.
CPC ........ *H04N 19/0006* (2013.01); *H04L 1/0009* (2013.01); *H04L 1/1877* (2013.01);
(Continued)

(58) Field of Classification Search
CPC ................. H04N 19/00; H04L 1/00
USPC .......................... 375/240.01–240.2
See application file for complete search history.

(56) References Cited

U.S. PATENT DOCUMENTS 7,958,435 B2*  6/2011  Kure ............. H04L 1/1877
                                              714/749
8,045,467 B2  10/2011  Apostolopoulos
(Continued)

FOREIGN PATENT DOCUMENTS

JP       2009-545238    12/2009
JP       4513725         5/2010

OTHER PUBLICATIONS

International Search Report, mailed Nov. 13, 2012, in corresponding International Application No. PCT/JP2012/006200.
(Continued)

*Primary Examiner* — Dave Czekaj
*Assistant Examiner* — Shanika Brumfield
(74) *Attorney, Agent, or Firm* — Greenblum & Bernstein, P.L.C.

(57) ABSTRACT

A data processing device calculates the number of temporary redundant packets based on the transmission rate of a wireless network and the frame composition ratio between I frames and P frames, calculates a temporary redundant packet rate based on the transmission rate and the number of temporary redundant packets, calculates an encoding rate from the transmission rate and the temporary redundant packet rate, encodes video data at the encoding rate to packetize the video data, calculates the number of redundant packets added to each frame obtained as a result of the processing on the video data, and adds redundant packets to each frame.

12 Claims, 21 Drawing Sheets

(51) Int. Cl.
*H04N 21/2662* (2011.01)
*H04N 21/61* (2011.01)
*H04N 21/6373* (2011.01)
*H04N 21/6437* (2011.01)
*H04N 19/67* (2014.01)
*H04N 21/2383* (2011.01)

(52) U.S. Cl.
CPC ......... *H04N 19/67* (2014.11); *H04N 21/2383* (2013.01); *H04N 21/23611* (2013.01); *H04N 21/2662* (2013.01); *H04N 21/6131* (2013.01); *H04N 21/6373* (2013.01); *H04N 21/6437* (2013.01)

(56) References Cited

U.S. PATENT DOCUMENTS

| | | |
|---|---|---|
| 8,234,548 B2 | 7/2012 | Kure et al. |
| 8,516,346 B2 | 8/2013 | Kure et al. |
| 8,738,986 B2 * | 5/2014 | Srinivas .................. G06F 11/10 |
| | | 714/752 |
| 2002/0090029 A1 * | 7/2002 | Kim .................. H04N 21/23406 |
| | | 375/240.03 |
| 2005/0013249 A1 * | 1/2005 | Kong ................ H04L 29/06027 |
| | | 370/235 |
| 2008/0025206 A1 | 1/2008 | Huang et al. |

OTHER PUBLICATIONS

Mehmet U. Demircin et al., "Finite-Horizon FEC-Rate Adaptation for Real-Time Wireless Mutimedia", Wireless Communications and Networking Conference, 2004, vol. 3, Mar. 2004, pp. 1770-1775.

Cesar Diaz et al., "A Video-Aware FEC-Based Unequal Loss Protection System for Video Streaming over RTP", Consumer Electronics, IEEE Transactions on Consumer Electronics, vol. 57, Issue: 2, May 2011, pp. 523-531.

* cited by examiner

FIG. 7

| NUMBER OF DATA PACKETS: K | PACKET LOSS RATE BEFORE FEC: p | | | | | | | | | |
|---|---|---|---|---|---|---|---|---|---|---|
| | 1% | 2% | 3% | 4% | 5% | 6% | 7% | 8% | 9% | 10% |
| 1 | 1 | 1 | 1 | 2 | 2 | 2 | 2 | 2 | 2 | 2 |
| 2 | 1 | 1 | 2 | 2 | 2 | 2 | 3 | 3 | 3 | 3 |
| 3 | 1 | 2 | 2 | 2 | 2 | 3 | 3 | 3 | 3 | 3 |
| 4 | 1 | 2 | 2 | 2 | 3 | 3 | 3 | 3 | 4 | 4 |
| 5 | 1 | 2 | 2 | 3 | 3 | 3 | 3 | 4 | 4 | 4 |
| 6 | 1 | 2 | 2 | 3 | 3 | 3 | 4 | 4 | 4 | 4 |
| 7 | 1 | 2 | 2 | 3 | 3 | 4 | 4 | 4 | 4 | 5 |
| 8 | 1 | 2 | 3 | 3 | 3 | 4 | 4 | 4 | 5 | 5 |
| 9 | 1 | 2 | 3 | 3 | 3 | 4 | 4 | 5 | 5 | 5 |
| 10 | 1 | 2 | 3 | 3 | 3 | 4 | 4 | 5 | 5 | 5 |

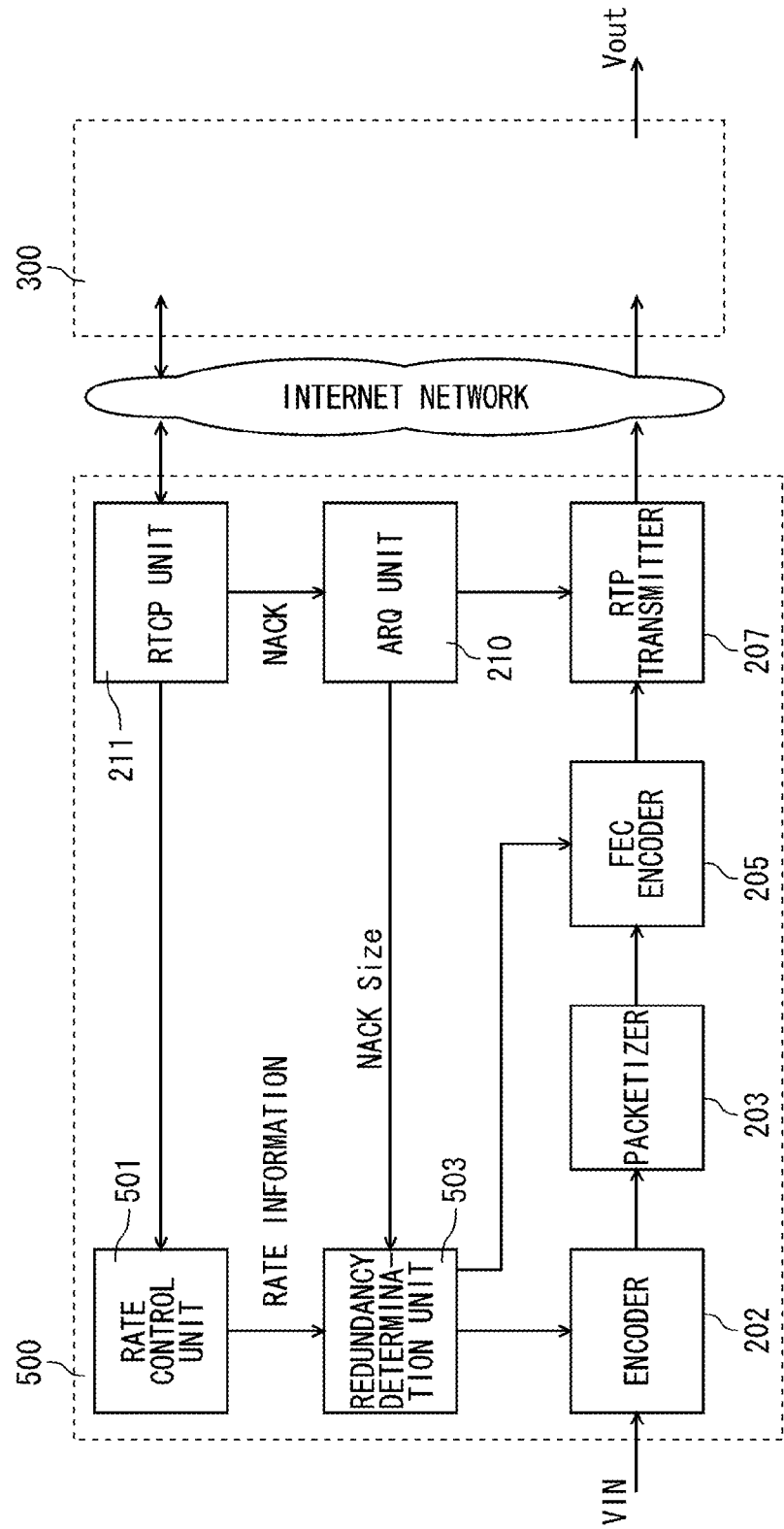
FIG. 17 --PRIOR ART--

FIG. 18 --PRIOR ART--

| TOTAL TRANSMISSION RATE – RETRANSMISSION DATA RATE (kbps) | RTT (msec) | | | | | |
|---|---|---|---|---|---|---|
| | 10 | 30 | 50 | 70 | 110 | |
| 500 | 0 | 1 | 1 | 2 | 5 | |
| 1000 | 0 | 1 | 2 | 3 | 6 | |
| 1500 | 0 | 1 | 2 | 3 | 6 | |
| 2000 | 0 | 1 | 2 | 3 | 7 | |
| 2500 | 0 | 1 | 2 | 4 | 8 | |
| 3000 | 0 | 1 | 2 | 4 | 8 | |
| 3500 | 0 | 1 | 2 | 4 | 9 | |
| 4000 | 0 | 1 | 2 | 4 | 10 | |
| 4500 | 0 | 1 | 2 | 4 | 10 | |

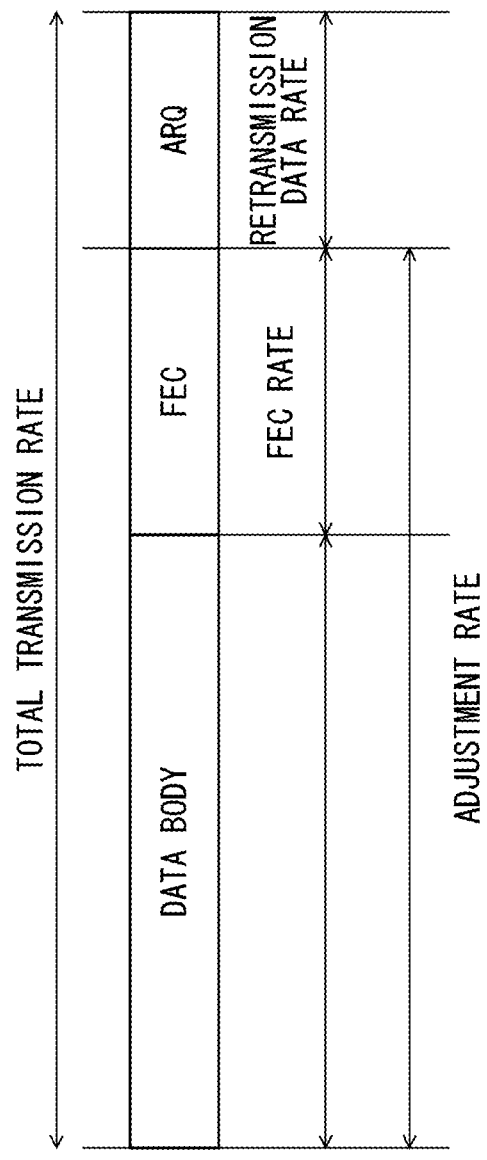
FIG. 19 --PRIOR ART--

--PRIOR ART--

--PRIOR ART--

DATA PROCESSING DEVICE AND DATA PROCESSING METHOD

TECHNICAL FIELD

The present disclosure relates to a data processing device and a data processing method for calculating the number of redundant packets to be added to data packets of video data.

BACKGROUND ART

In an IP-based real-time communication system, such as a TV conference system, full high-definition (Full HD) video transmission is already possible. In an IP network environment, a packet loss of about several percent occurs. Accordingly, video or audio quality is ensured using a retransmission (Automatic Repeat reQuest: ARQ) or packet loss correction (Forward Error Correction (FEC)) function. In the case of a real-time video transmission system, the ARQ is effective in the environment where the Round Trip Time (RTT) is short, and the FEC is effective in the environment where the RTT is long or the environment where the packet loss rate is high.

In recent years, a video transmission system in a mobile environment has appeared with an increase in the speed of wireless channels, such as WiMAX or Long Term Evolution (LTE). Since a phenomenon such as handover or changes in the wireless environment due to the movement of a terminal occurs frequently in a wireless environment, the packet loss rate or the RTT tends to be worse than that in a wired environment. Accordingly, the FEC is suitable as a method of ensuring the video or audio quality in the mobile environment. In the FEC, redundant packets (hereinafter, also referred to as "parity") are generated from data packets of a video or audio, and are transmitted on a network together with the data packets. In a wireless environment where the transmission bandwidth is limited, however, the transmission bandwidth of data packets is compressed due to the overhead of redundant packets, and this may have an adverse effect on the video or audio quality. Therefore, system design to ensure a certain degree of quality while reducing the amount of redundancy is required.

Patent Literature 1 discloses a transmission-side configuration in a video transmission system. FIG. 17 is a block diagram showing configuration examples of a transmission apparatus and a reception apparatus that configure a communication system disclosed in Patent Literature 1. A rate control unit 501 provided in a transmission apparatus 500 determines the total transmission rate from network information (packet loss rate, RTT, and the like) notified from an RTCP unit 211, and notifies a redundancy determination unit 503 of the result. In addition, the RTCP unit 211 notifies the ARQ unit 210 of NACK information from a reception apparatus 300. The redundancy determination unit 503 calculates an adjustment rate, which can be used in the actual data transmission, from the total transmission rate notified from the rate control unit 501 and the retransmission data size notified from the ARQ unit 210, and notifies an encoder 202 of the result. In addition, the redundancy determination unit 503 determines the number of redundant packets using a redundancy table shown in FIG. 18 that is configured to contain the RTT and an adjustment rate obtained by subtracting the retransmission data rate from the total transmission rate, and notifies an FEC encoder 205 of the result.

CITATION LIST

Patent Literature

Patent Literature 1: Japanese Patent No. 4513725

SUMMARY OF INVENTION

Technical Problem

In Patent Literature 1 described above, when determining the number of redundant packets using the redundancy table shown in FIG. 18, the adjustment rate obtained by subtracting the retransmission data rate from the total transmission rate is used as a parameter. As shown in FIG. 19, the adjustment rate is a rate including the data rate of redundant packets by the FEC (hereinafter, referred to as "FEC rate"). According to the redundancy table shown in FIG. 18, for example, the number of redundant packets when the adjustment rate (=total transmission rate−retransmission data rate) is 2 Mbps is set to 0 to 7 depending on the RTT. Therefore, the maximum value of the number of redundant packets added when retransmission is not taken into consideration is 7. Assuming that the packet size of a typical network is 1200 bytes, the number of packets that is transmittable when the total transmission rate is 2 Mbps is 208 packets. In addition, the number of redundant packets by the FEC is also included in the number of packets that is transmittable.

When transmitting the video data, the encoding unit of the FEC is a frame of the video. Therefore, as shown in FIG. 20, the ratio of the FEC rate to the total transmission rate increases as the frame rate increases. For example, if the frame rate is 20 fps, the number of redundant packets is 140 packets (=7×20 frames), and the FEC rate of the total transmission rate exceeds 60%. In addition, if the frame rate is 30 fps, the number of redundant packets is 210 packets (=7×30 frames), and the FEC rate of the total transmission rate exceeds 100%.

Thus, in the above-described method of calculating the number of redundant packets, the FEC rate is not taken into consideration in the adjustment rate notified to the encoder 202. For this reason, when transmitting video data, it is not possible to transmit the data body related to the video content as the frame rate of the video increases.

In addition, since the encoding unit of the FEC is a frame as described above, it is possible to calculate the FEC rate from the number of redundant packets and the frame rate. The FEC encoder 205 generates redundant packets corresponding to the FEC rate, and gives the redundant packets to each frame of the video.

The encoder 202 encodes the video data to generate a frame using intra-frame encoding (I frame) and a frame using inter-frame predictive encoding (P frame). As for the number of frames included in one second, for example, several I frames are included in one second while several tens of P frames are included in one second. That is, the number of P frames included in one second is larger than the number of I frames included in one second. In addition, for the number of packets required to express one frame, the number of I frames is larger than the number of P frames.

Accordingly, when the FEC encoder 205 gives redundant packets corresponding to the FEC rate to each frame of the video data, the same number of redundant packets are given to each frame of the video regardless of the type of the frame, as shown in FIG. 21. However, since the number of packets of the I frame is larger than the number of packets of the P frame as described above, the balance of the number of packets that form one frame and the number of redundant packets given to the frame becomes different between I and P frames. As a result, the packet loss tolerance of the I frame during the transmission is reduced, and the reproduction quality of transmitted video data on the receiving side is degraded.

The condition can be improved by increasing the FEC rate if the frame rate of the video is low. However, when the frame rate is high, it is preferable to suppress the FEC rate as much as possible as shown in FIG. 20. Accordingly, it is not preferable to increase the FEC rate.

It is an object of the present disclosure to provide a data processing device and a data processing method capable of improving the reproduction quality of video data on a receiving side in a packet loss environment while suppressing the data rate of redundant packets of the transmission rate even if the frame rate of the video is high.

Solution to Problem

The present disclosure provides a data processing device for processing video data transmitted through a wireless network, the data processing device including: a bandwidth estimator, configured to estimate a transmission rate of the wireless network; a frame composition ratio obtaining unit, configured to obtain a frame composition ratio that indicates a ratio between I frames using intra-frame encoding and P frames using inter-frame predictive encoding, the I and P frames forming a video; a temporary redundant packet rate calculator, configured to calculate a number of temporary redundant packets based on the frame composition ratio and the transmission rate estimated by the bandwidth estimator and to calculate a temporary redundant packet rate from the transmission rate and the number of temporary redundant packets; an encoding rate calculator, configured to calculate an encoding rate for encoding the video data from the transmission rate and the temporary redundant packet rate; a video data processor, configured to encode the video data at the encoding rate and packetize the encoded video data; and a redundant encoding processor, configured to calculate a number of redundant packets to be added to each frame, which is obtained as a result of processing in the video data processor, and to add redundant packets to each frame, wherein the redundant packets are obtained by performing redundant encoding processing on data packets of the encoded video data.

The present disclosure also provides a data processing method for processing video data transmitted through a wireless network, the data processing method including: a bandwidth estimation step of estimating a transmission rate of the wireless network; a frame composition ratio obtaining step of obtaining a frame composition ratio that indicates a ratio between I frames using intra-frame encoding and P frames using inter-frame predictive encoding, the I and P frames forming a video; a temporary redundant packet rate calculation step of calculating a number of temporary redundant packets based on the frame composition ratio and the transmission rate estimated in the bandwidth estimation step and calculating a temporary redundant packet rate from the transmission rate and the number of temporary redundant packets; an encoding rate calculation step of calculating an encoding rate for encoding the video data from the transmission rate and the temporary redundant packet rate; a video data processing step of encoding the video data at the encoding rate and packetizing the encoded video data; and a redundant encoding processing step of calculating a number of redundant packets to be added to each frame, which is obtained as a result of the processing in the video data processing step, and adding redundant packets to each frame, wherein the redundant packets are obtained by performing redundant encoding processing on data packets of the encoded video data.

Advantageous Effects of Invention

According to the data processing device and the data processing method according to the present disclosure, it is possible to improve the reproduction quality of video data on the receiving side in a packet loss environment while suppressing the data rate of redundant packets of the transmission rate even if the frame rate of the video is high.

BRIEF DESCRIPTION OF DRAWINGS

FIG. 7 is a diagram showing an example of a number-of-redundant packets calculation table.

FIG. 17 is a block diagram showing an example of the configuration of a transmission apparatus and a reception apparatus that form a communication system disclosed in Patent Literature 1.

FIG. 18 is a diagram showing an example of a redundancy table disclosed in Patent Literature 1.

FIG. 19 is a diagram showing the relationship of the total transmission rate, the adjustment rate, the retransmission data rate, and the FEC rate.

DESCRIPTION OF EMBODIMENTS

Hereinafter, embodiments of the present disclosure will be described with reference to the diagrams.

First Embodiment

Figure 1:
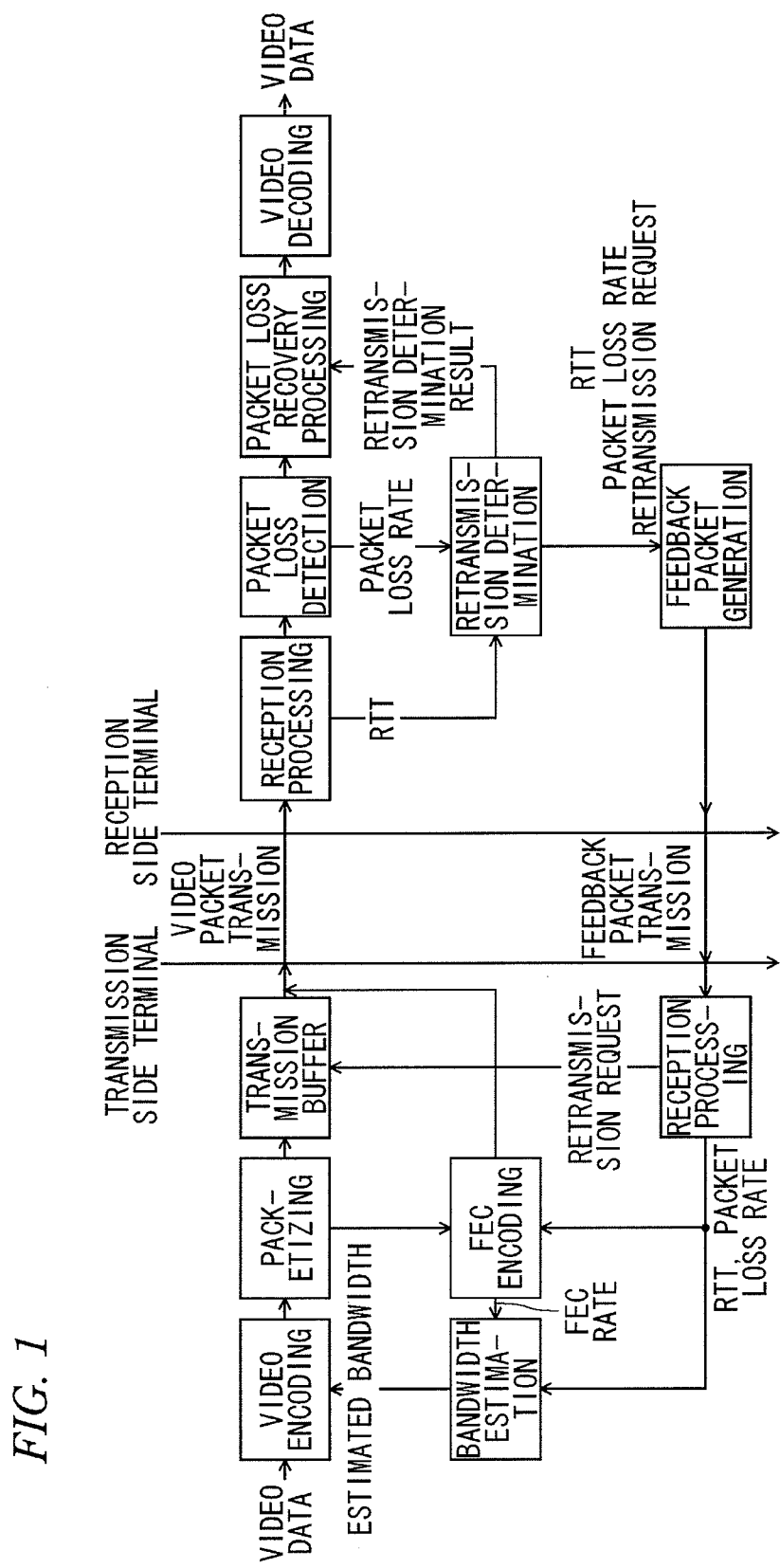
FIG. 1 is a diagram showing an operation of each terminal in a video transmission system according to an embodiment in which video data is transmitted from a transmission side terminal to a reception side terminal through a wireless network.

FIG. 1 is a diagram showing the operation of each terminal in a video transmission system according to an embodiment in which video data is transmitted from a transmission side terminal to a reception side terminal through a wireless network. In addition, although the transmission rate is a sum of the video rate and the audio rate in the case of a normal video transmission system, only the video rate will be described in the present embodiment.

The transmission side terminal (hereinafter, referred to as a "transmission terminal") encodes video data based on a bandwidth-estimated network bandwidth (=encoding rate). The transmission terminal packetizes the encoded video data, and copies the packetized encoded video data to a transmission buffer in preparation for retransmission. In addition, the transmission terminal performs FEC encoding of the packetized video data. Typically, the transmission terminal transmits an FEC packet and a data packet of the video data on the network as video packets. In addition, when there is a retransmission request from the receiving side, the transmission terminal transmits data packets stored in the transmission buffer instead of transmitting new data packets.

Bandwidth estimation for obtaining the encoding rate is performed based on feedback packet information, such as the RTT and the packet loss rate. However, since no feedback packet is present at the time of first transmission, the transmission terminal performs initial bandwidth estimation. In addition, at the time of bandwidth estimation, a rate excluding the FEC rate of the FEC packet is obtained as the encoding rate.

After receiving the video packets, the reception side terminal (hereinafter, referred to as a "reception terminal") performs reception processing to extract the data packets and calculate the RTT from the transmission time written in the header portion. When a packet loss is detected in the received packets, the reception terminal calculates the packet loss rate, performs retransmission determination from the RTT and the packet loss rate, and sends notification of the retransmission determination result. When the RTT is so large that retransmission is not possible, the reception terminal recovers the lost packet by performing FEC decoding as packet loss recovery processing and then decodes the encoded video data and outputs the decoded video data.

On the other hand, when retransmission is possible, the reception terminal sends a retransmission request to the transmission terminal. In order that the transmission terminal performs bandwidth estimation or FEC encoding, the packet loss information or the RTT calculated by the reception terminal is notified to the transmission terminal as a feedback packet. However, when the reception terminal sends a retransmission request to the transmission terminal, the retransmission request is also included in the feedback packet. If there is no packet loss in the received packets when the reception terminal receives retransmission packets, the reception terminal decodes the encoded video data and outputs the video data.

Figure 2:
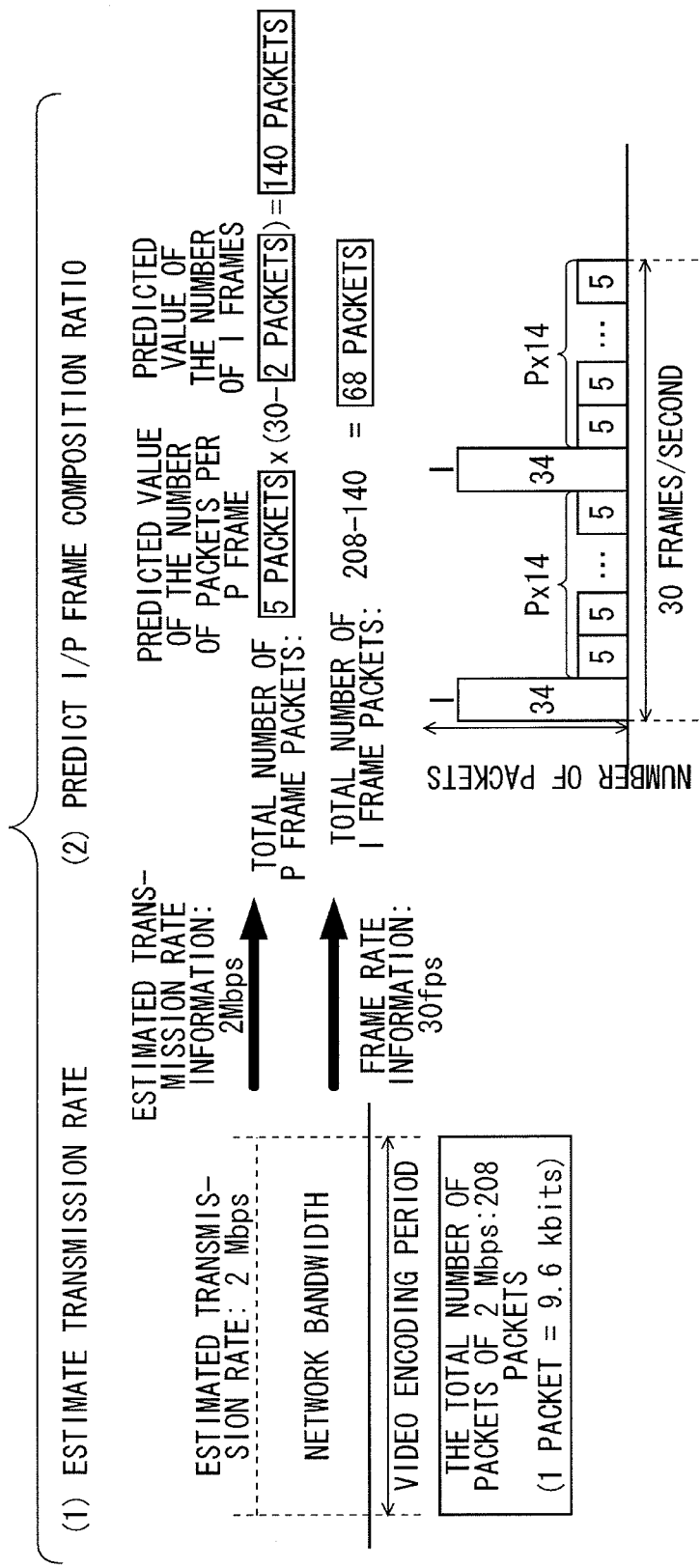
FIG. 2 is a diagram for explaining a method of calculating the number of redundant packets by a transmission terminal.

Next, a method of calculating the number of redundant packets by the transmission terminal will be described with reference to FIGS. 2 to 4.

First, the transmission terminal estimates a transmission rate indicating the available network bandwidth per video encoding period. In the example shown in FIG. 2, the network transmission rate is estimated to be 2 Mbps. Then, the transmission terminal predicts the frame composition ratio of the I frame using intra-frame encoding and the P frame using inter-frame predictive encoding based on the estimated transmission rate and the frame rate of the video.

The frame composition ratio can be calculated by predicting the respective number of packets that form I and P frames. In the example shown in FIG. 2, when the data size of 1 packet is set to 1200 bytes=9.6 kbits, it is shown that the number of packets that is transmittable per second when the estimated transmission rate is 2 Mbps is 208 packets. The frame rate is assumed to be 30 fps. That is, the number of frames per second is 30. In this case, the transmission terminal can calculate the predicted value of the total number of packets of each of the I and P frames by predicting the number of packets (in FIG. 2, 5 packets) per P frame and the number of I frames (in FIG. 2, 2 frames) per second. In addition, the transmission terminal can also calculate the predicted value (in FIG. 2, 34 frames) of the number of packets per I frame. A method of predicting the number of packets per P frame and the number of I frames per second will be described later.

Figure 3:
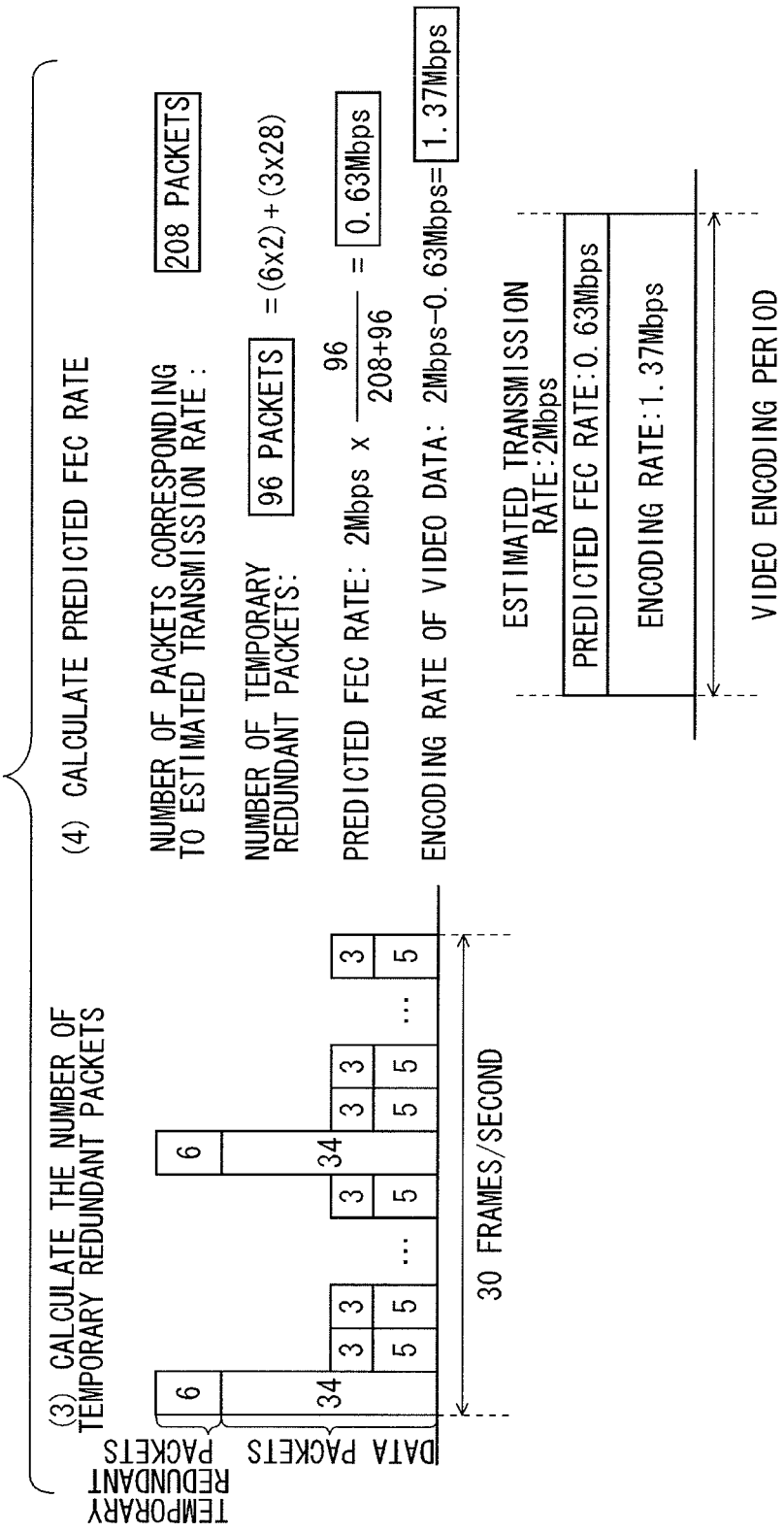
FIG. 3 is a diagram for explaining a method of calculating the number of redundant packets by the transmission terminal.
Figure 4:
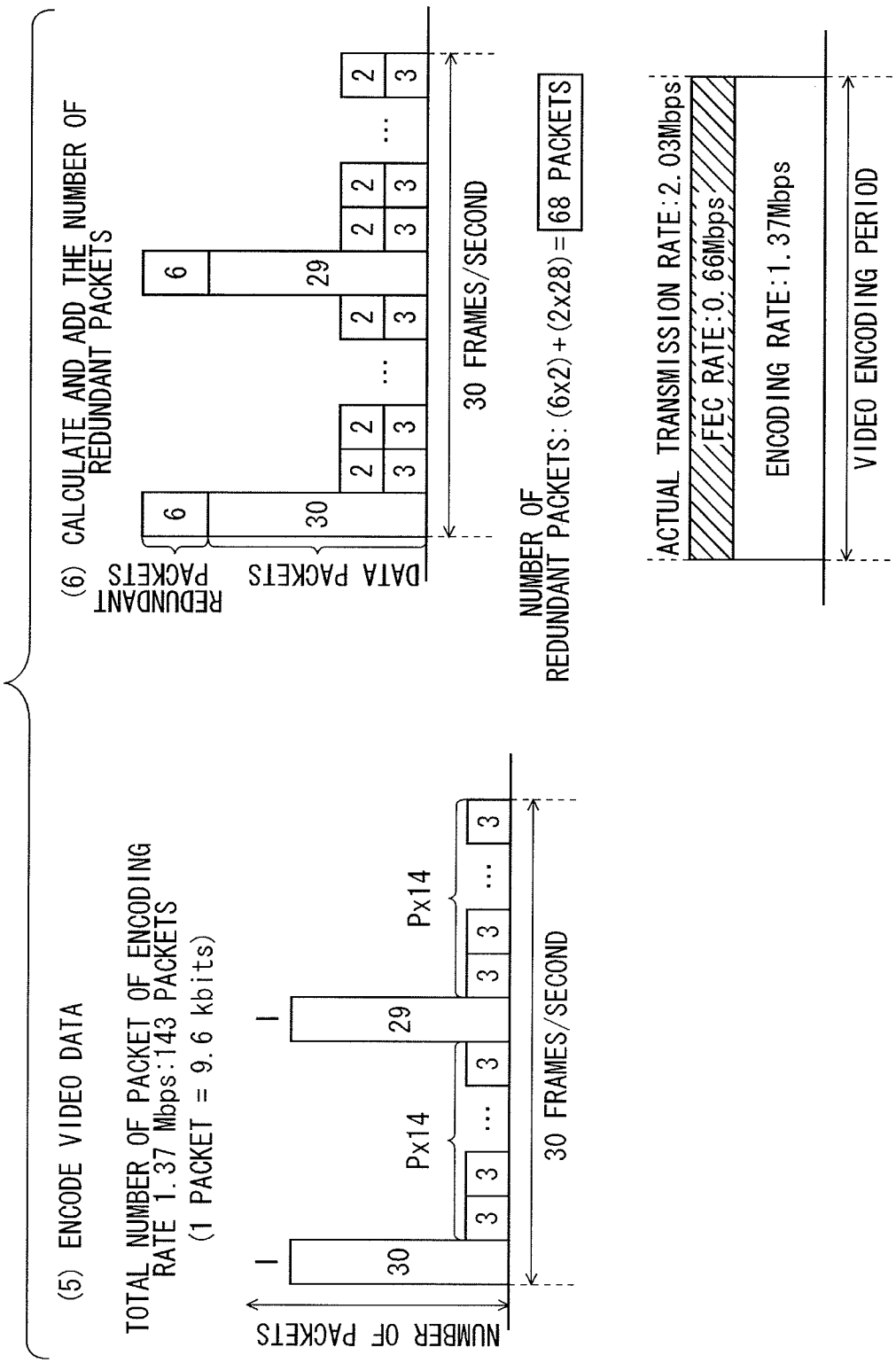
FIG. 4 is a diagram for explaining a method of calculating the number of redundant packets by the transmission terminal.

Then, the transmission terminal calculates the number of temporary redundant packets, as shown in FIG. 3. That is, for the number of data packets of each frame, the transmission terminal calculates the number of temporary redundant packets of each frame from the theoretical expression of the FEC method so as to be equal to or less than the packet loss or the frame loss corresponding to the desired video quality. The theoretical expression of the FEC method will be described later.

Then, the transmission terminal calculates the predicted FEC rate from the number of packets and the number of temporary redundant packets corresponding to the estimated transmission rate. In the example shown in FIG. 3, 0.63 Mbps obtained by multiplying the estimated transmission rate 2 Mbps by the ratio (=96/(208+96)) of the number of temporary redundant packets 96 to the total number of packets 304 (=208+96) of the number of packets 208 and the number of temporary redundant packets 96 (=6×2+3×28) corresponding to the estimated transmission rate 2 Mbps is calculated as the predicted FEC rate.

Then, the transmission terminal calculates the encoding rate from the estimated transmission rate and the predicted FEC rate, and encodes the video data. In addition, in the example shown in FIG. 3, 1.37 Mbps obtained by subtracting the predicted FEC rate 0.63 Mbps from the estimated transmission rate 2 Mbps is the encoding rate of the video data. The total number of packets corresponding to the encoding rate 1.37 Mbps is 143 packets, and the number of packets near the encoding rate is output as a result of encoding of the video data in the transmission terminal. In the example shown in FIG. 4, a frame structure in which the number of I frames is 2 and the number of P frames is 28 is shown. Among 143 packets, 59 packets are generated for the I frame and the remaining 84 packets are generated for the P frame.

Finally, the transmission terminal calculates the number of redundant packets of each frame for the number of data packets of each frame from the theoretical expression of the FEC method and adds the redundant packets to the data packet of the video data. In addition, a method of calculating the number of redundant packets is the same as the method of calculating the number of temporary redundant packets shown in FIG. 3. In the example shown in FIG. 4, since 68 (=6×2+2×28) redundant packets are generated and the encoding rate of the video data is 1.37 Mbps, the FEC rate is 0.66 Mbps. Accordingly, since the actual transmission rate that is a sum of the encoding rate and the FEC rate are 2.03 Mbps, the actual transmission rate almost meets the estimated transmission rate 2 Mbps.

According to the method described above, since the video data is encoded at the encoding rate calculated after predicting the FEC rate of the transmission rate, an appropriate number of redundant packets corresponding to the video frame structure (the number of data packets of each of the I and P frames) are added. For this reason, even if the frame rate of a video is high, the bandwidth of the video data is ensured while suppressing the data rate of redundant packets. As a result, it is possible to improve the reproduction quality of video data on the receiving side in a packet loss environment, such as the transmission of video data through the wireless communication network.

Figure 5:
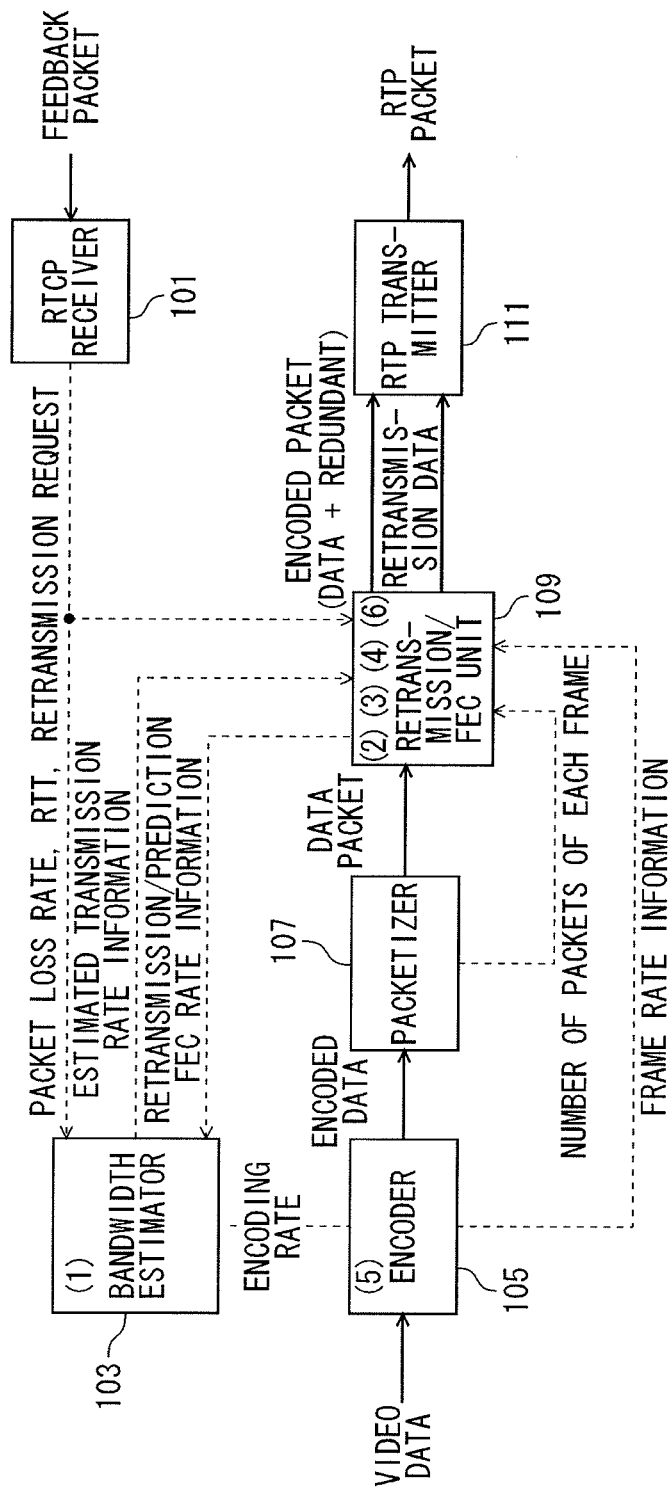
FIG. 5 is a block diagram showing the configuration of a transmission terminal of the first embodiment.

FIG. 5 is a block diagram showing the configuration of the transmission terminal according to the first embodiment. In addition, symbols (1) to (6) in FIG. 5 indicate the number of each operation shown in FIGS. 2 to 4. As shown in FIG. 5, the transmission terminal includes an RTCP receiver 101, a bandwidth estimator 103, an encoder 105, a packetizer 107, a retransmission/FEC unit 109, and an RTP transmitter 111.

The RTCP receiver 101 receives the feedback packet transmitted from the reception terminal, and extracts information related to the packet loss rate of the network, RTT, and a retransmission request. The information related to the packet loss rate, RTT, and the retransmission request is input to the bandwidth estimator 103 and the retransmission/FEC unit 109.

The bandwidth estimator 103 inputs a network bandwidth estimated from the packet loss rate and the RTT, as estimated transmission rate information, to the retransmission/FEC unit 109. In addition, the retransmission rate and the predicted FEC rate are received from the retransmission/FEC unit 109, and a rate obtained by subtracting the retransmission rate and the predicted FEC rate from the estimated transmission rate is input to the encoder 105.

The encoder 105 performs video data encoding processing. Specifically, the encoder 105 performs compression encoding of the video data according to the encoding rate notified from the bandwidth estimator 103 using an encoding method, such as h.264, and encoded data of the video expressed by the I and P frames is input to the packetizer 107. In addition, the encoder 105 inputs the frame rate information of the video to the retransmission/FEC unit 109.

The packetizer 107 packetizes the encoded data, which is input from the encoder 105, in a specified packet size, and inputs the result to the retransmission/FEC unit 109 as data packets of the video data. In this case, the packetizer 107 also notifies the retransmission/FEC unit 109 of the number of data packets of each frame.

When there is a retransmission request from the reception terminal, the retransmission/FEC unit 109 outputs the stored retransmission data to the RTP transmitter 111. When there is no retransmission request, the retransmission/FEC unit 109 determines whether to perform only retransmission, perform both retransmission and FEC, or perform only the FEC, as packet loss recovery means, based on the RTT. When it is determined that only retransmission is performed, the retransmission/FEC unit 109 stores the data packets in the transmission buffer and also outputs the data packets to the RTP transmitter 111. When it is determined that both retransmission and FEC are performed or when it is determined that only the FEC is performed, the retransmission/FEC unit 109 generates redundant packets the number of which has been calculated from the packet loss rate and the number of data packets of each frame, adds the generated redundant packets to the data packets of the video data, and inputs the result to the RTP transmitter 111 as encoded packets. In addition, when it is determined that both retransmission and FEC are performed, the retransmission/FEC unit 109 uses a packet loss rate after being recovered to some extent by retransmission as the above-described packet loss rate. In addition, the retransmission/FEC unit 109 calculates the estimated transmission rate information input from the bandwidth estimator 103, predicted FEC rate information calculated from the frame rate information input from the encoder 105, and retransmission rate information calculated from the retransmission request, and inputs these pieces of information to the bandwidth estimator 103.

The RTP transmitter 111 adds header information to the input encoded packets or retransmission packets, and transmits the result to the network as RTP packets.

Figure 6:
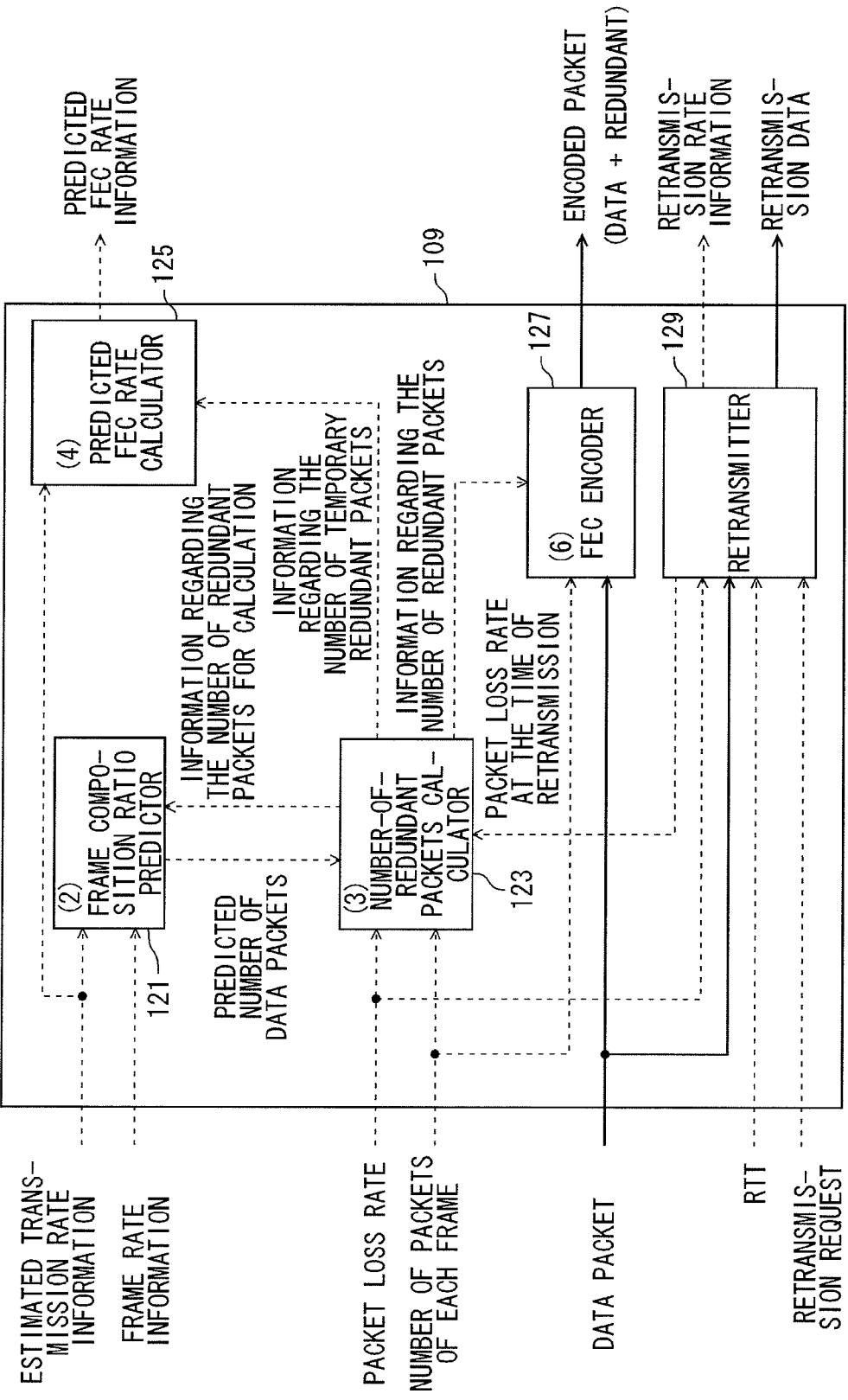
FIG. 6 is a block diagram showing the internal configuration of a retransmission/FEC unit 109 provided in the transmission terminal of the first embodiment.

Hereinafter, the retransmission/FEC unit 109 will be described in detail with reference to FIG. 6. FIG. 6 is a block diagram showing the internal configuration of the retransmission/FEC unit 109 provided in the transmission terminal of the first embodiment. As shown in FIG. 6, the retransmission/FEC unit 109 includes a frame composition ratio predictor 121, a number-of-redundant packets calculator 123, a predicted FEC rate calculator 125, an FEC encoder 127, and a retransmitter 129.

The frame composition ratio predictor 121 predicts the frame composition ratio by calculating the predicted number of data packets of each frame based on the estimated transmission rate information from the bandwidth estimator 103 and the frame rate information of the video from the encoder 105. The estimated transmission rate, the data size of one packet, and the frame rate are assumed to be R [Mbps], S [byte], and $f_R$ [fps], respectively. Assuming that the predicted value of the number of I frames per video encoding period is $N_{Iframe}$ and the predicted value of the number of packets per P frame is $N_{packet\_P}$, the total number of packets $P_{packet}$ of the P frame is calculated from Expression (1).

[Expression 1]

$$P_{packet} = N_{packet\_P} \cdot (f_R - N_{Iframe}) \qquad (1)$$

On the other hand, the total number of packets $I_{packet}$ of the I frame is calculated from Expression (2) using the estimated transmission rate R, the data size S of one packet, and the total number of packets $P_{packet}$ of the P frame calculated in Expression (1).

[Expression 2]

$$I_{packet} = \left\lceil \frac{R \cdot 10^6}{8S} \right\rceil - P_{packet} \qquad (2)$$

In addition, when the frame composition ratio predictor 121 calculates the total number of packets $P_{packet}$ of the P frame from Expression (1), the predicted value of the number of I frames $N_{Iframe}$ and the predicted value of the number of packets per P frame $N_{packet\_P}$ are determined.

Using the total number of packets $P_{packet}$ of the P frame and the total number of packets $I_{packet}$ of the I frame as the number of data packets of video data, the number-of-redundant packets calculator 123 calculates the number of redundant packets, which satisfies the packet loss rate corresponding to the desired video quality (packet loss rate after FEC), as information of the number of redundant packets for calculation. Taking the Reed-Solomon code as an example, assuming that the packet loss rate before FEC is p, the number of data packets is K, the number of redundant packets is L, and the packet loss rate after FEC is P, the packet loss rate P after the FEC is calculated from Expression (3).

[Expression 3]

$$P = \frac{1}{K}\sum_{i=1}^{K} i \cdot {}_{k}C_{i}(1-p)^{K-i} \sum_{j=t}^{L} {}_{L}C_{j}p^{j}(1-p)^{L-j} \quad (3)$$

$$t = \begin{cases} 0 & (L < i \le K) \\ L - i + 1 & (0 < i \le L) \end{cases}$$

Since the packet loss rate after FEC P and the packet loss rate before FEC p are known information and the number of data packets K is also input to the number-of-redundant packets calculator 123, an optimal value $L_{opt}$ of the number of redundant packets satisfying the desired video quality from Expression (3) can be calculated from Expression (4).

[Expression 4]

$$L_{opt} = \underset{L=1,2,\ldots}{\mathrm{argmin}} \left| P - \frac{1}{K}\sum_{i=1}^{K} i \cdot {}_{k}C_{i}(1-p)^{K-i} \sum_{j=t}^{L} {}_{L}C_{j}p^{j}(1-p)^{L-j} \right| \quad (4)$$

$$t = \begin{cases} 0 & (L < i \le K) \\ L - i + 1 & (0 < i \le L) \end{cases}$$

The number of redundant packets for calculation are calculated by substituting the total number of packets $P_{packet\_P}$ of the P frame and the total number of packets $I_{packet}$ of the I frame into the number of data packets K in Expression (4). Since the optimal value $L_{opt}$ of the number of redundant packets for calculation changes if $P_{packet}$ and $I_{packet}$ that are predicted values change, the optimal value $L_{opt}$ is expressed as in Expressions (5I) and (5P) shown below.

[Expression 5]

$$L_{opt}(I_{packet}) = \underset{L=1,2,\ldots}{\mathrm{argmin}} \left| P - \frac{1}{I_{packet}}\sum_{i=1}^{I_{packet}} i \cdot {}_{I_{packet}}C_{i}(1-p)^{I_{packet}-i} \sum_{j=t}^{L} {}_{L}C_{j}p^{j}(1-p)^{L-j} \right| \quad (5I)$$

$$L_{opt}(P_{packet}) = \underset{L=1,2,\ldots}{\mathrm{argmin}} \left| P - \frac{1}{P_{packet}}\sum_{i=1}^{P_{packet}} i \cdot {}_{P_{packet}}C_{i}(1-p)^{P_{packet}-i} \sum_{j=1}^{L} {}_{L}C_{j}p^{j}(1-p)^{L-j} \right| \quad (5P)$$

$$t = \begin{cases} 0 & (L < i \le I_{packet} \text{ or } P_{packet}) \\ L - i + 1 & (0 < i \le L) \end{cases}$$

In the present embodiment, the number of redundant packets is determined such that the FEC rate of the total transmission rate is minimized. For this reason, the total number of packets $P_{packet}$ of the P frame and the total number of packets $I_{packet}$ of the I frame that are predicted values are determined such that the optimal value $L_{opt}$ of the number of redundant packets for calculation shown in Expressions (5I) and (5P) is minimized. The total number of packets $P_{packet}$ of the P frame and the total number of packets $I_{packet}$ of the I frame are values calculated from the predicted value of the number of I frames per video encoding period $N_{Iframe}$ and the predicted value of the number of packets per P frame $N_{packet\_P}$ by Expressions (1) and (2). In other words, the predicted value of the number of I frames $N_{Iframe}$ and the predicted value of the number of packets per P frame $N_{packet\_P}$ are determined such that the optimal value $L_{opt}$ of the number of redundant packets for calculation shown in Expressions (5I) and (5P) is minimized. From the above, an optimal value $N_{Iframe\_opt}$ of the predicted value of the number of I frames $N_{Iframe}$ and an optimal value $N_{packet\_P\_opt}$ of the predicted value of the number of packets per P frame $N_{packet\_P}$ can be calculated from Expression (6).

[Expression 6]

$$(N_{Iframe\_opt}, N_{packet\_P\_opt}) = \underset{\substack{N_{Iframe}=1,2,\ldots \\ N_{packet\_P}=1,2,\ldots}}{\mathrm{argmin}} |L_{opt}(I_{packet}) + L_{opt}(P_{packet})| \quad (6)$$

$$= \underset{\substack{N_{Iframe}=1,2,\ldots \\ N_{packet\_P}=1,2,\ldots}}{\mathrm{argmin}} \left| L_{opt}\left(\left\lceil\frac{R \cdot 10^{6}}{8S}\right\rceil - N_{packet\_P} \cdot (f_{R} - N_{Iframe})\right) + L_{opt}(N_{packet\_P} \cdot (f_{R} - N_{Iframe})) \right|$$

The number-of-redundant packets calculator 123 calculates the optimal value of the number of redundant packets of each frame satisfying the desired video quality from the number of data packets and the packet loss rate. In addition, in order to determine the number of temporary redundant packets required for calculation of the predicted FEC rate, the number-of-redundant packets calculator 123 returns the number of redundant packets for calculation to the frame composition ratio predictor 121 when the predicted number of data packets is input.

First, a method of calculating the number of temporary redundant packets will be described. Since the optimal values $P_{packet\_opt}$ and $I_{packet\_opt}$ of the predicted number of data packets to minimize the FEC rate are calculated by the frame composition ratio predictor 121, the number-of-redundant packets calculator 123 can calculate the number of temporary redundant packets by substituting the optimal values into Expressions (5I) and (5P). Assuming that the number of temporary redundant packets is $L_{opt\_temp}$, the number of temporary redundant packets $L_{opt\_temp}$ can be calculated from Expression (7).

[Expression 7]

$$L_{opt\_temp} = L(P_{packet\_opt}) + L(I_{packet\_opt}) \quad (7)$$

Then, the number-of-redundant packets calculator 123 calculates the number of redundant packets by substituting each value into Expression (4) since the packet loss rate before FEC p and the number of data packets K are input and the packet loss rate after FEC P is also a value set according to the desired video quality even though this is a method of calculating the number of redundant packets. In addition, when the packet loss rate at the time of retransmission is input from the retransmitter 129, the packet loss rate at the time of retransmission is used instead of the packet loss rate before FEC p.

In addition, for the calculation of the number of redundant packets, if the packet loss rate after FEC corresponding to the video quality is a fixed value, it is also possible to calculate the value of Expression (4) in advance and store it as a number-of-redundant packets calculation table. In this case, the number-of-redundant packets calculator 123 can return the number of redundant packets with reference to the number-of-redundant packets calculation table when the number of data packets and the packet loss rate are input. FIG. 7 shows an example of the number-of-redundant packets calculation table at the time of P=0.1% in Expression (4).

The predicted FEC rate calculator 125 calculates the predicted FEC rate from the estimated transmission rate information notified from the bandwidth estimator 103 and the information of the temporary number of packets calculated by the number-of-redundant packets calculator 123. The predicted FEC rate is summed with the retransmission rate from the retransmitter 129, and the result is notified to the bandwidth estimator 103 as retransmission/prediction FEC rate information.

Assuming that the estimated transmission rate information is R [Mbps], the data size of one packet is S [byte], and the number of temporary redundant packets is $L_{opt\_temp}$, the predicted FEC rate $R_{FEC}$ [Mbps] is calculated from Expression (8).

[Expression 8]

$$R_{FEC} = R \frac{L_{opt\_temp}}{\left\lceil \frac{R \cdot 10^6}{8S} \right\rceil + L_{opt\_temp}} \quad (8)$$

Figure 8:
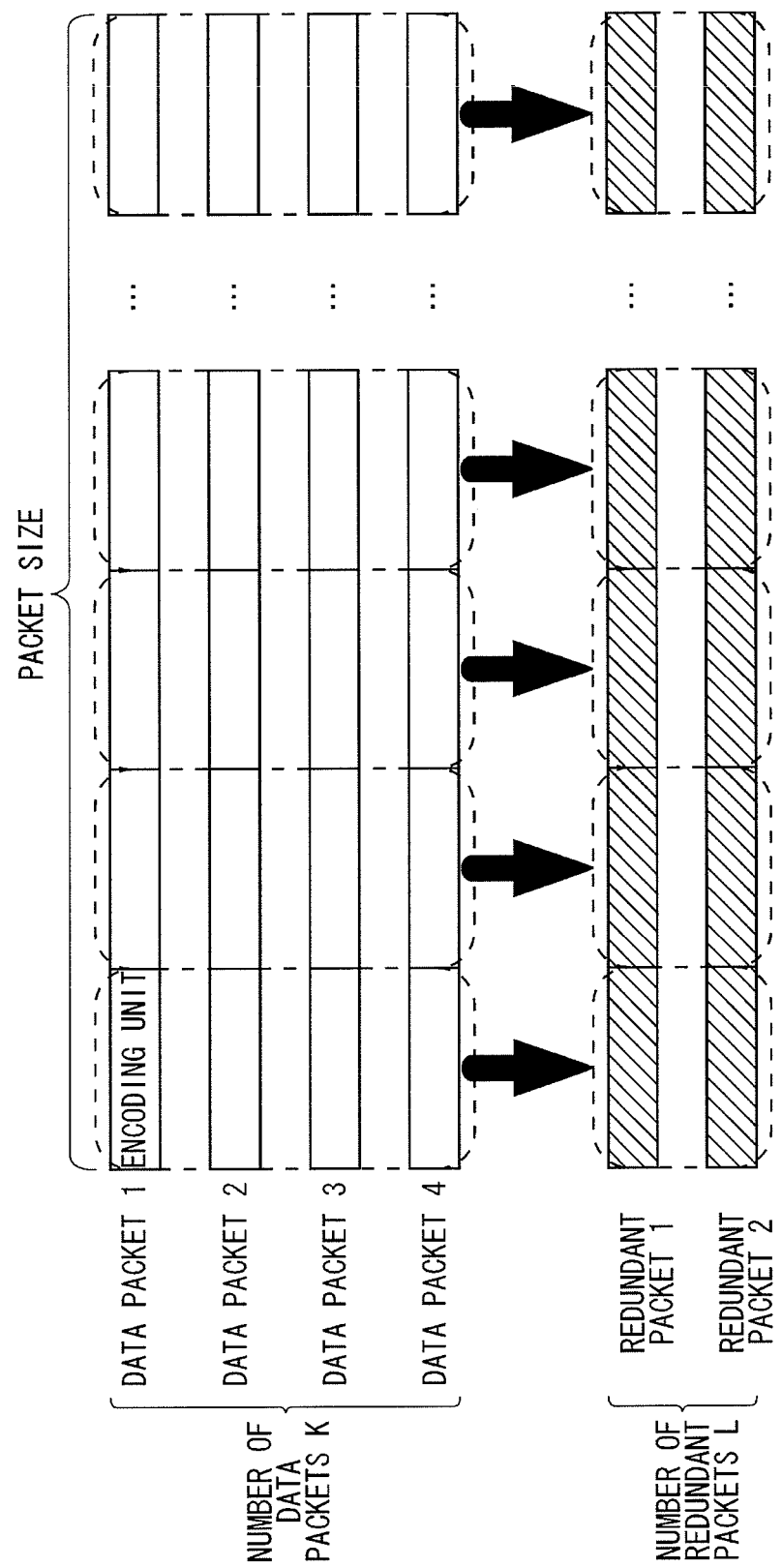
FIG. 8 is a diagram showing how to generate redundant packets from data packets.

The FEC encoder 127 generates redundant packets from data packets based on the data packets and the number of redundant packets calculated by the number-of-redundant packets calculator 123, and outputs the redundant packets as encoded packets together with the data packets. Assuming that the number of data packets is K and the number of redundant packets is L, (K+L, K) may be notified as an FEC encoding parameter. FIG. 8 shows a state where redundant packets are generated from data packets. As shown in FIG. 8, since it is not possible to encode data packets simultaneously, a redundant packet is generated by repeating processing of one packet for each encoding unit. FIG. 8 shows a state of encoding of the FEC parameter (6, 4).

When there is a retransmission request from the reception terminal, the retransmitter 129 outputs data packets, which are stored in a transmission buffer (not shown) in the retransmitter 129, to the RTP transmitter 111 as retransmission data. In addition, the retransmitter 129 calculates and outputs retransmission rate information from the amount of retransmission data. In addition, the retransmitter 129 determines from the RTT whether or not to perform retransmission as packet loss recovery means, calculates a packet loss rate at the time of retransmission when performing retransmission, and outputs the packet loss rate at the time of retransmission to the number-of-redundant packets calculator 123.

Assuming that the number of retransmissions is $N_{ARQ}$, the reception allowable delay time is $t_{adm}$ [ms], and the RTT is $t_{RTT}$ [ms], the number of retransmissions $N_{ARQ}$ is calculated from Expression (9).

[Expression 9]

$$N_{ARQ} = \left\lfloor \frac{t_{adm}}{t_{RTT}} \right\rfloor \quad (9)$$

In addition, the reception allowable delay time $t_{adm}$ is a value set in advance by the system.

In addition, assuming that the packet loss rate at the time of retransmission is p', the packet loss rate at the time of retransmission p' is calculated from Expression (10) using the number of retransmissions $N_{ARQ}$ and the packet loss rate p.

[Expression 10]

$$p' = p^{N_{ARQ}+1} \quad (10)$$

In addition, since the retransmission rate needs to be calculated in the same unit as a unit when calculating the predicted FEC rate, the retransmission rate is calculated for each video encoding period. Assuming that the retransmission rate is $R_{ARQ}$ [Mbps] and the number of packets that matches the retransmission request is $N_{packet\_ARQ}$, the data rate of one packet for the data size of one packet S [byte] is calculated from $8S/10^6$ [Mbps], and the retransmission rate $R_{ARQ}$ is calculated from Expression (11).

[Expression 11]

$$R_{ARQ} = \frac{8S}{10^6} N_{packet\_ARQ} \quad (11)$$

Figure 9:
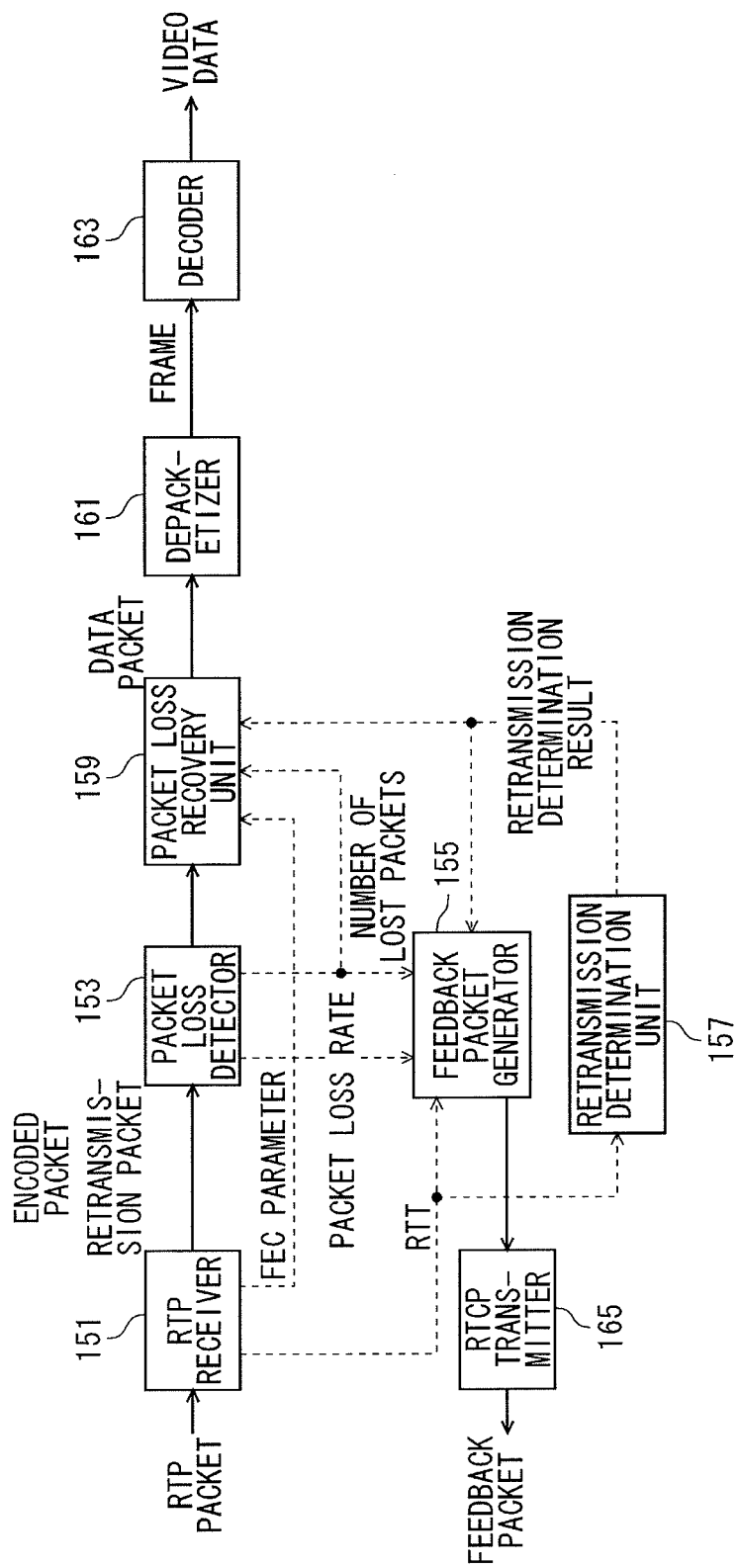
FIG. 9 is a block diagram showing the configuration of a reception terminal of the first embodiment.

FIG. 9 is a block diagram showing the configuration of the reception terminal of the first embodiment. As shown in FIG. 9, the reception terminal includes an RTP receiver 151, a packet loss detector 153, a feedback packet generator 155, a retransmission determination unit 157, a packet loss recovery unit 159, a depacketizer 161, a decoder 163, and an RTCP transmitter 165.

The RTP receiver 151 receives RTP packets, and extracts the RTT from the header information. When an FEC packet is added, the number of data packets and the FEC parameter indicating "the number of data packets+the number of redundant packets" are extracted. The encoded packets or retransmission packets received by the RTP receiver 151 are input to the packet loss detector 153.

The packet loss detector 153 detects a loss packet from the sequence number of the packet header, calculates the number of lost packets, and inputs the number of lost packets to the packet loss recovery unit 159 and the feedback packet generator 155 and calculates the packet loss rate. The packet loss rate is calculated from "the number of lost packets/the total number of transmitted packets" in the video encoding period. However, when the number of received packets is small and the granularity of the packet loss rate is rough, the packet loss detector 153 can also use the average packet loss in a plurality of sections. The packet loss rate is input to the feedback packet generator 155. In addition, encoded packets and retransmission packets after packet loss detection are input to the packet loss recovery unit 159. In addition, when there is a loss in retransmission packets, the loss information of the retransmission packet is notified to the feedback packet generator 155.

The feedback packet generator 155 generates a feedback packet, and inputs the feedback packet to the RTCP transmitter 165. As information included in the feedback packet, there are the RTT, the packet loss rate, and retransmission request. The retransmission request is generated from a retransmission determination result, which indicates whether or not retransmission is possible, and the number of lost packets. The feedback packet is transmitted from the RTCP transmitter 165.

The retransmission determination unit 157 determines from the RTT whether or not retransmission is possible when a packet loss occurs, and notifies the packet loss recovery unit 159 and the feedback packet generator 155 of the retransmission determination result. As shown in Expression (9), the number of retransmissions can be calculated from the reception allowable delay time and the RTT. Accordingly, the retransmission determination unit 157 generates a retransmission determination result of "retransmission" when the number of retransmissions is equal to or greater than 1 and a retransmission determination result of "no retransmission" in other cases.

When the number of lost packets notified from the packet loss detector 153 is equal to or greater than 1, the packet loss recovery unit 159 performs packet loss recovery processing and outputs data packets in which the lost packets have been recovered. The depacketizer 161 converts the data packets into frames and outputs the frames to the decoder 163. The decoder 163 decodes the frames input from the depacketizer 161 and outputs video data.

Figure 10:
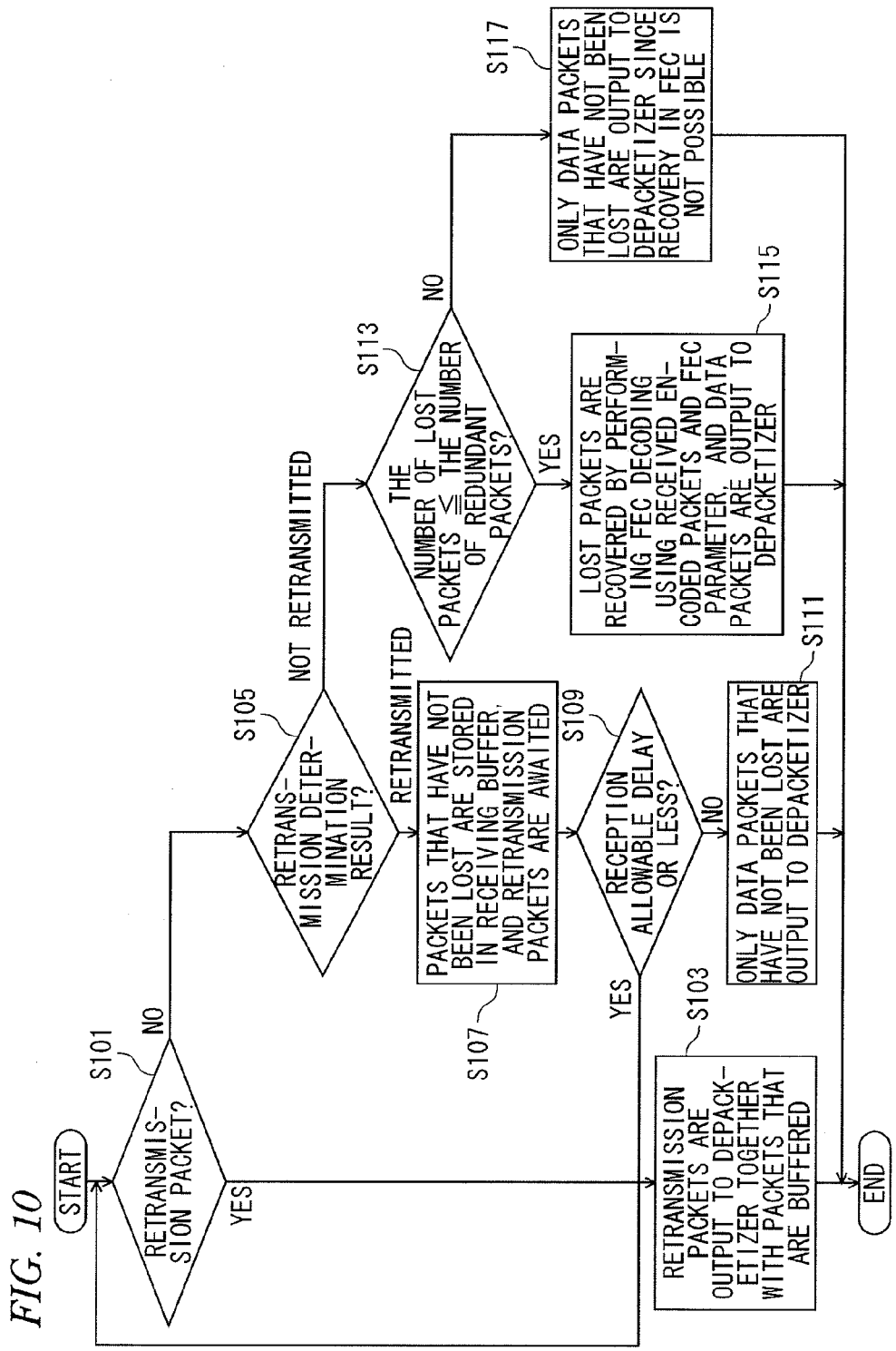
FIG. 10 is a flow chart showing the operation of a packet loss recovery unit 159 provided in the reception terminal.

FIG. 10 is a flow chart showing the operation of the packet loss recovery unit 159 provided in the reception terminal. First, the packet loss recovery unit 159 determines the type of input packets from the packet header (step S101). When the received packets are retransmission packets, packet loss is recovered by the reception of the retransmission packets. Accordingly, the packet loss recovery unit 159 outputs the retransmission packets together with data packets buffered in the reception terminal (step S103). When the received packets are data packets, if the retransmission determination result in step S105 indicates that retransmission is performed, packets that have not been lost are stored in the receiving buffer and the arrival of retransmission packets is awaited during the reception allowable delay time (step S107). When it is determined that the reception allowable delay time is exceeded in step S109, the packet loss recovery unit 159 outputs only data packets, which have not been lost, to the depacketizer 161 (step S111). When the received packets are data packets and retransmission is not performed, if an FEC packet is added to the data packets, the packet loss recovery unit 159 performs packet loss recovery processing by FEC decoding. When it is determined that the number of redundant packets calculated from the FEC parameter is equal to or greater than the number of lost packets in step S113, the packet loss recovery unit 159 recovers the lost packets by performing FEC decoding using the received encoded packets and the FEC parameter and outputs only data packets including the recovered packets to the depacketizer 161 (step S115). When the number of redundant packets is less than the number of lost packets (a case where no FEC packet is added is also included), the packet loss recovery unit 159 outputs only data packets that have not been lost to the depacketizer 161 since the recovery in the FEC is not possible (step S117).

Thus, when determining the encoding rate of video data, the retransmission rate and the FEC rate of the total transmission rate are notified. Accordingly, even if the frame rate is high, the bandwidth of video data is ensured. In addition, an appropriate number of redundant packets are added to each of the I and P frames based on the frame structure after encoding. Accordingly, it is possible to improve the reproduction quality of video data at the reception terminal in a packet loss environment while suppressing the data rate of redundant packets.

Second Embodiment

Figure 11:
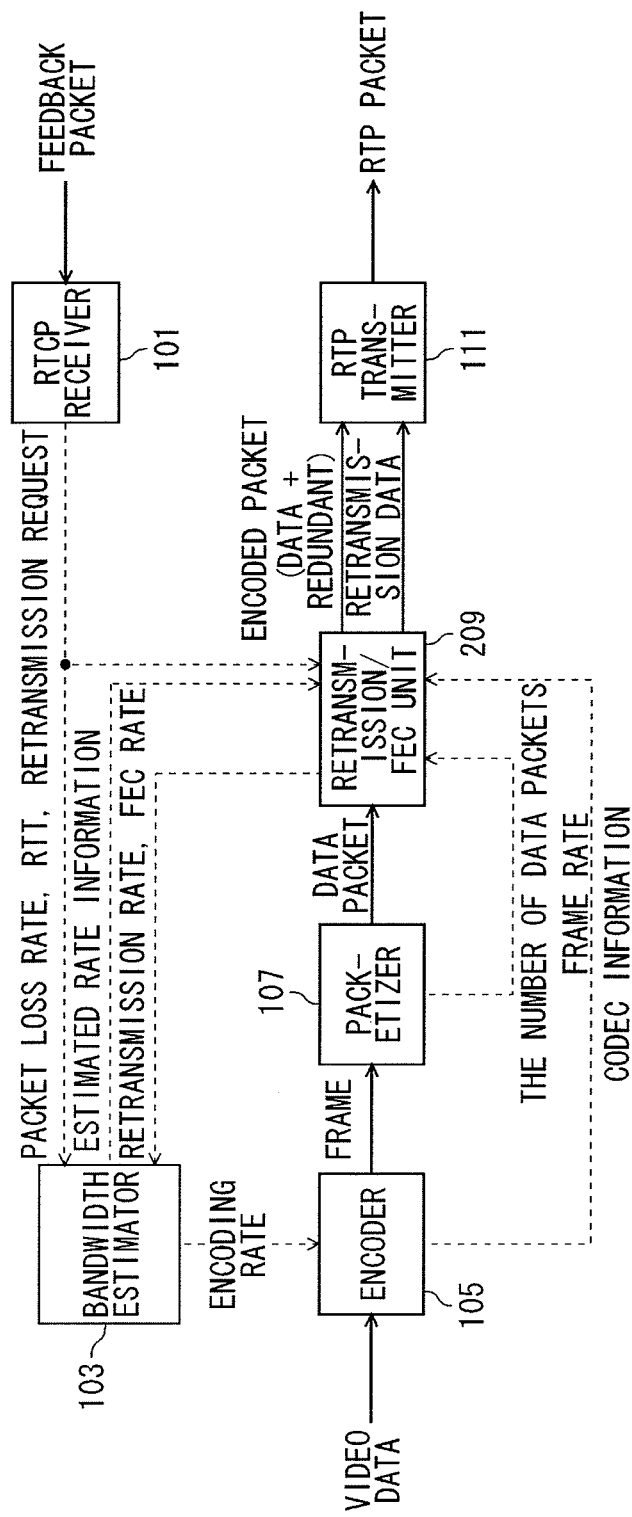
FIG. 11 is a block diagram showing the internal configuration of a transmission terminal of a second embodiment.

FIG. 11 is a block diagram showing the internal configuration of a transmission terminal of a second embodiment. A difference between the transmission terminal of the second embodiment and the transmission terminal of the first embodiment is a retransmission/FEC unit 209. The transmission terminal of the second embodiment is the same as the transmission terminal of the first embodiment except for this point. Accordingly, in FIG. 11, the same reference numerals are given to components common to FIG. 5, and explanation of the same or equivalent portions as in the transmission terminal of the first embodiment will be simplified or omitted.

Although the frame rate information is notified to the retransmission/FEC unit 209 from the encoder 105 in the first embodiment, CODEC information indicating the last encoding result is notified to the retransmission/FEC unit 209 from the encoder 105 in the present embodiment. The number of I frames, the number of P frames, I frame information amount, and P frame information amount are included in the CODEC information.

Figure 12:
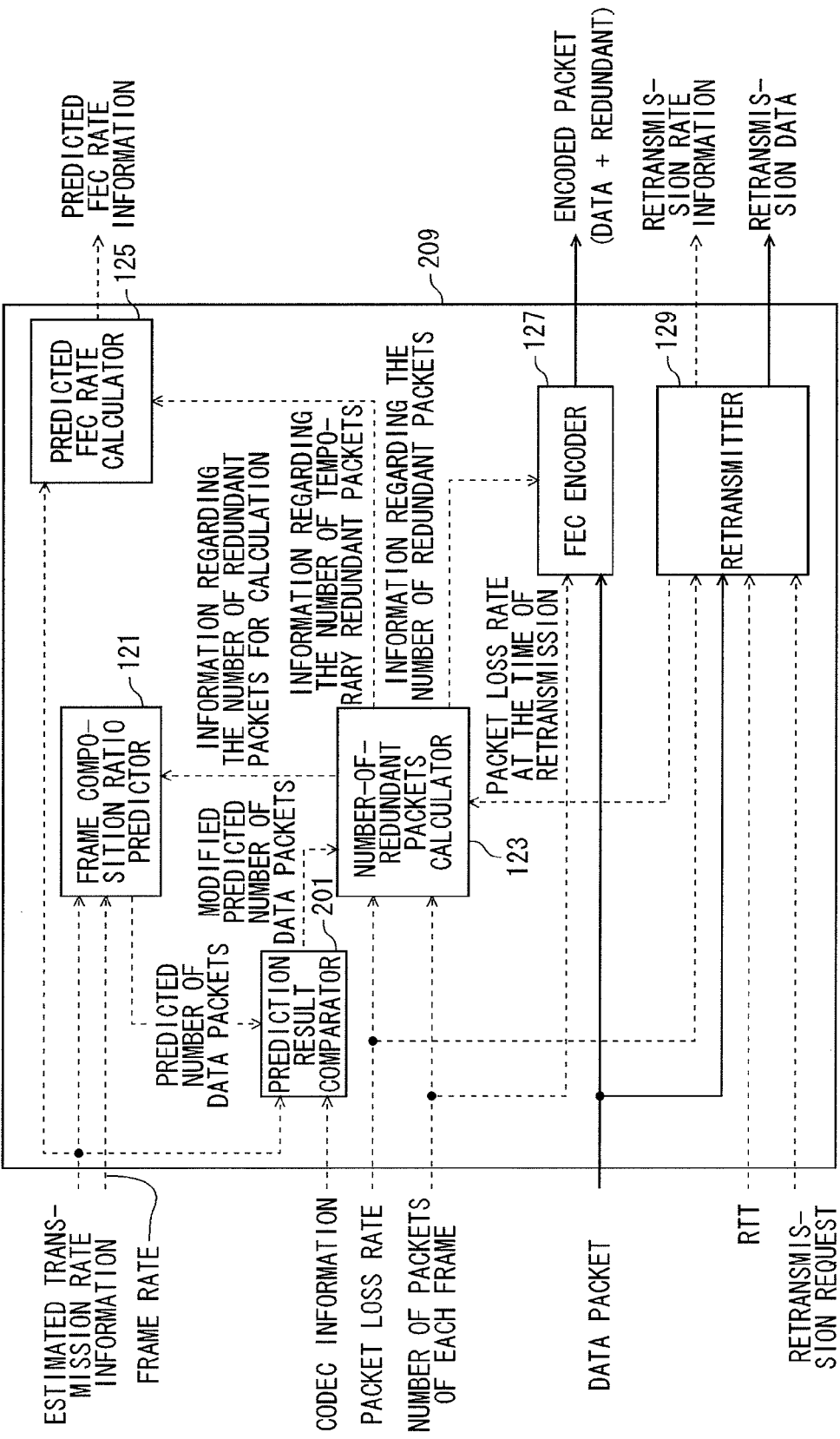
FIG. 12 is a block diagram showing the internal configuration of a retransmission/FEC unit 209 provided in the transmission terminal of the second embodiment.

FIG. 12 is a block diagram showing the internal configuration of the retransmission/FEC unit 209 provided in the transmission terminal of the second embodiment. As shown in FIG. 12, the retransmission/FEC unit 209 of the present embodiment includes a prediction result comparator 201 in addition to the components provided in the retransmission/FEC unit 109 of the first embodiment.

The prediction result comparator 201 outputs the modified predicted number of data packets from the CODEC information described above and the predicted number of data packets input from the frame composition ratio predictor 121. Assuming that the data size of one packet is S [byte], the number of I frames included in the CODEC information is $N_{codec\_Iframe}$, the number of P frames included in the CODEC information is $N_{codec\_Pframe}$, the I frame information amount is $D_{Iframe}$ [byte], and P frame information amount is $D_{Pframe}$ [byte], the number of data packets of I frame after encoding $I_{codec\_packet}$ and the number of data packets of P frame after encoding $P_{codec\_packet}$, all of which are past information, are calculated from Expressions (12I) and (12P), respectively.

[Expression 12]

$$I_{codec\_packet} = \frac{D_{Iframe}}{S} \quad (12I)$$

$$P_{codec\_packet} = \frac{D_{Pframe}}{S} \quad (12P)$$

Figure 13:
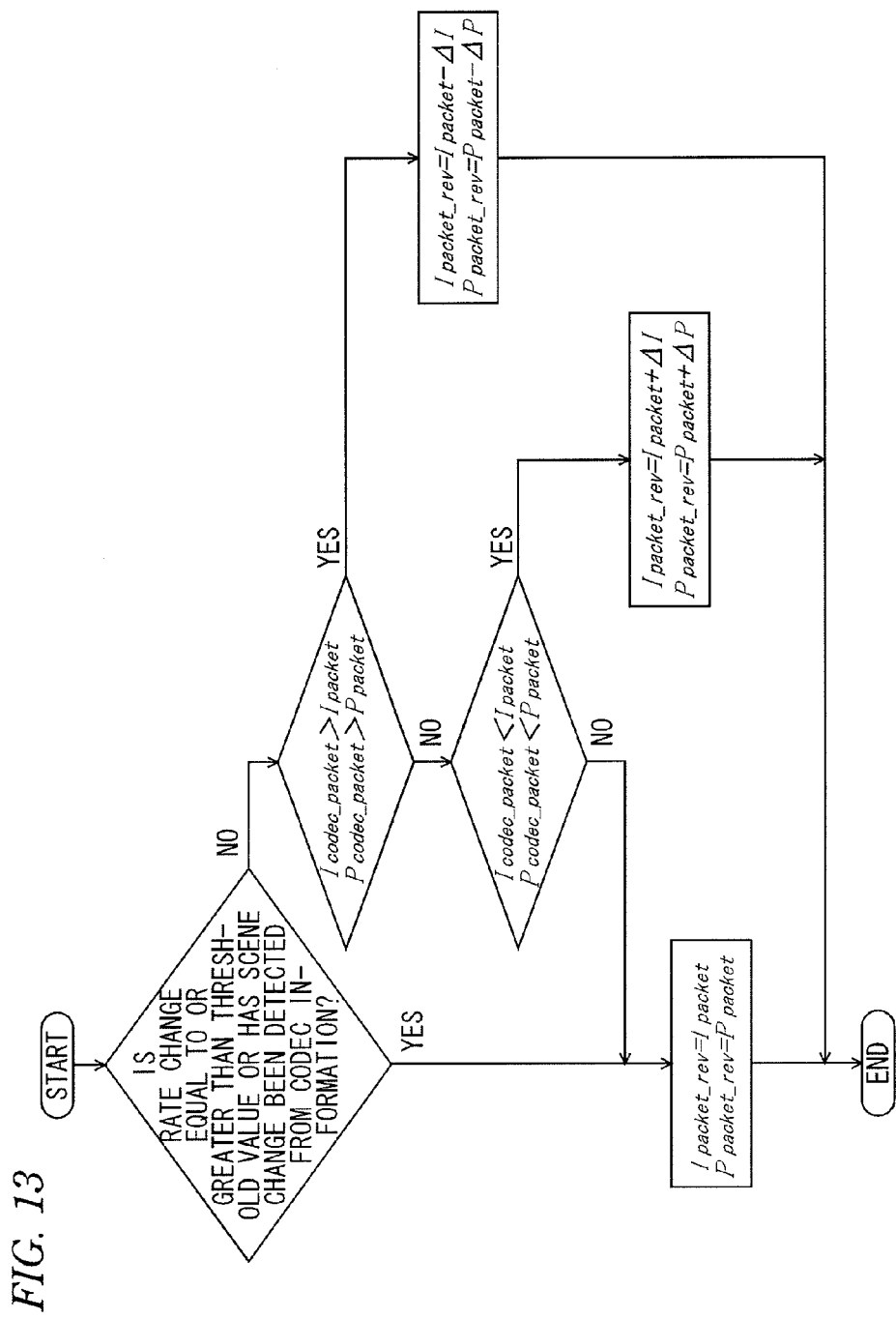
FIG. 13 is a flow chart when determining the modified predicted number of data packets output from a prediction result comparator 201 provided in the retransmission/FEC unit 209 of the transmission terminal of the second embodiment.

FIG. 13 is a flow chart when determining the modified predicted number of data packets output from the prediction result comparator 201 provided in the retransmission/FEC unit 209 of the transmission terminal of the second embodiment. As shown in FIG. 13, the prediction result comparator 201 compares the number of data packets $I_{codec\_packet}$ and $P_{codec\_packet}$ calculated from Expressions (12I) and (12P) with the predicted number of data packets $I_{packet}$ and $P_{packet}$ calculated from Expressions (1) and (2) by the frame composition ratio predictor 121, and outputs the modified predicted number of data packets $I_{packet\_rev}$ and $P_{packet\_rev}$. When a change in the estimated transmission rate is equal to or greater than the threshold value or when scene change information that can be calculated from the CODEC information is detected, the prediction result comparator 201 outputs the predicted number of data packets $I_{packet}$ and $P_{packet}$ calculated by the frame composition ratio predictor 121 as the modified predicted number of data packets $I_{packet\_rev}$ and $P_{packet\_rev}$ without a comparison with the past encoding results.

On the other hand, when a change in the estimated transmission rate is less than the threshold value and no scene change is detected, the prediction result comparator 201 performs a comparison with the past information. As a comparison result of the number of data packets, when the number of data packets of I frame after encoding $I_{codec\_packet}$ or the number of data packets of P frame after encoding $P_{codec\_packet}$, all of which are past information, is larger than the predicted number of data packets $I_{packet}$ and $P_{packet}$ (this is determined separately for I and P frames), the prediction result comparator 201 outputs the modified predicted number of data packets obtained by adding fixed correction values $\Delta I$ and $\Delta P$ to the predicted number of data packets $I_{packet}$ and $P_{packet}$. In addition, the correction values $\Delta I$ and $\Delta P$ are values set by the system. On the other hand, when the number of data packets of I frame after encoding $I_{codec\_packet}$ or the number of data packets of P frame after encoding $P_{codec\_packet}$ is smaller than the predicted number of data packets $I_{packet}$ and $P_{packet}$, the prediction result comparator 201 outputs the modified predicted number of data packets obtained by subtracting the fixed correction values $\Delta I$ and $\Delta P$ from the predicted number of data packets $I_{packet}$ and $P_{packet}$. In addition, when both are equal, the prediction result comparator 201 outputs the predicted number of data packets $I_{packet}$ and $P_{packet}$ as the modified predicted number of data packets $I_{packet\_rev}$ and $P_{packet\_rev}$ without correction.

As described above, in the present embodiment, since it is possible to improve the prediction accuracy by adjusting the predicted value of the frame composition ratio according to the level of the number of data packets of the I and P frames, an appropriate number of redundant packets are added to each of the I and P frames. As a result, it is possible to further improve the reproduction quality of video data at the reception terminal in a packet loss environment while suppressing the data rate of redundant packets.

Third Embodiment

Figure 14:
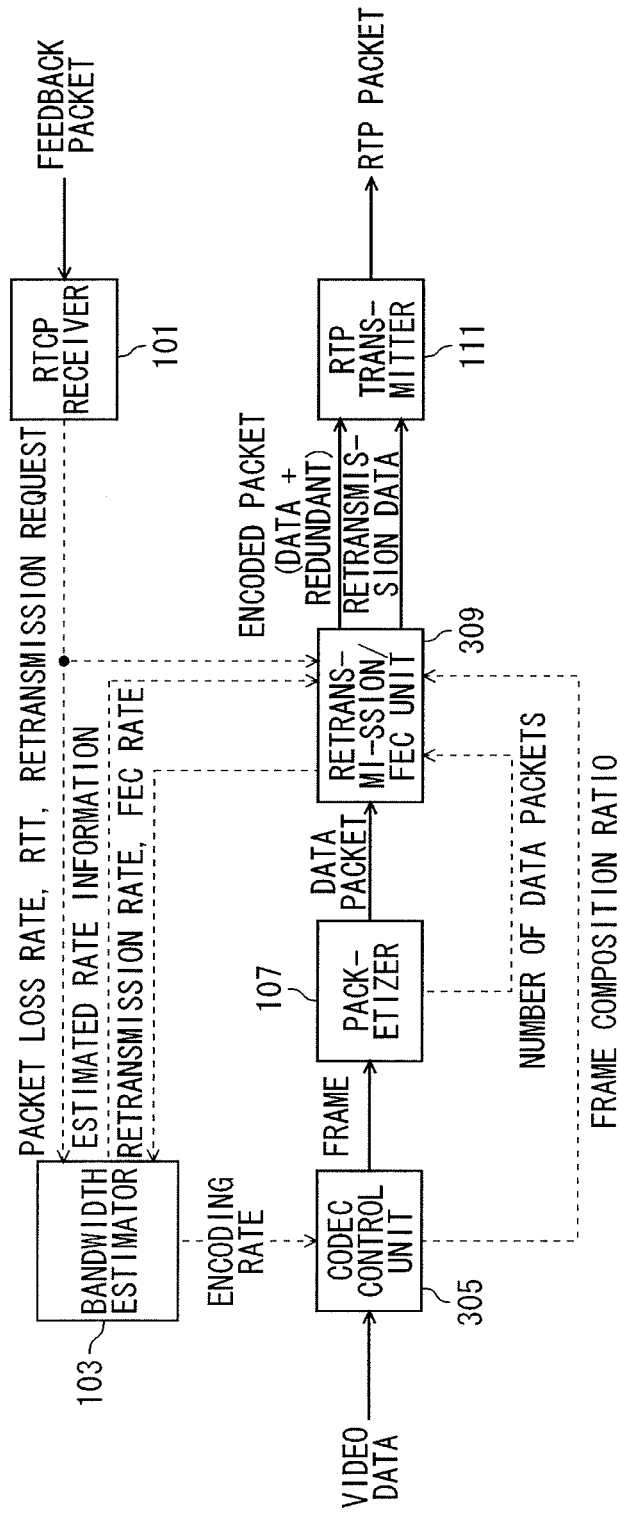
FIG. 14 is a block diagram showing the internal configuration of a transmission terminal of a third embodiment.

FIG. 14 is a block diagram showing the internal configuration of a transmission terminal of a third embodiment. A difference between the transmission terminal of the third embodiment and the transmission terminal of the first embodiment is an encoder 305 and a retransmission/FEC unit 309. The transmission terminal of the third embodiment is the same as the transmission terminal of the first embodiment except for this point. Accordingly, in FIG. 14, the same reference numerals are given to components common to FIG. 5, and explanation of the same or equivalent portions as in the transmission terminal of the first embodiment will be simplified or omitted.

Although the frame rate information is notified to the retransmission/FEC unit 109 from the encoder 105 in the first embodiment, a frame composition ratio is notified in the present embodiment.

Figure 15:
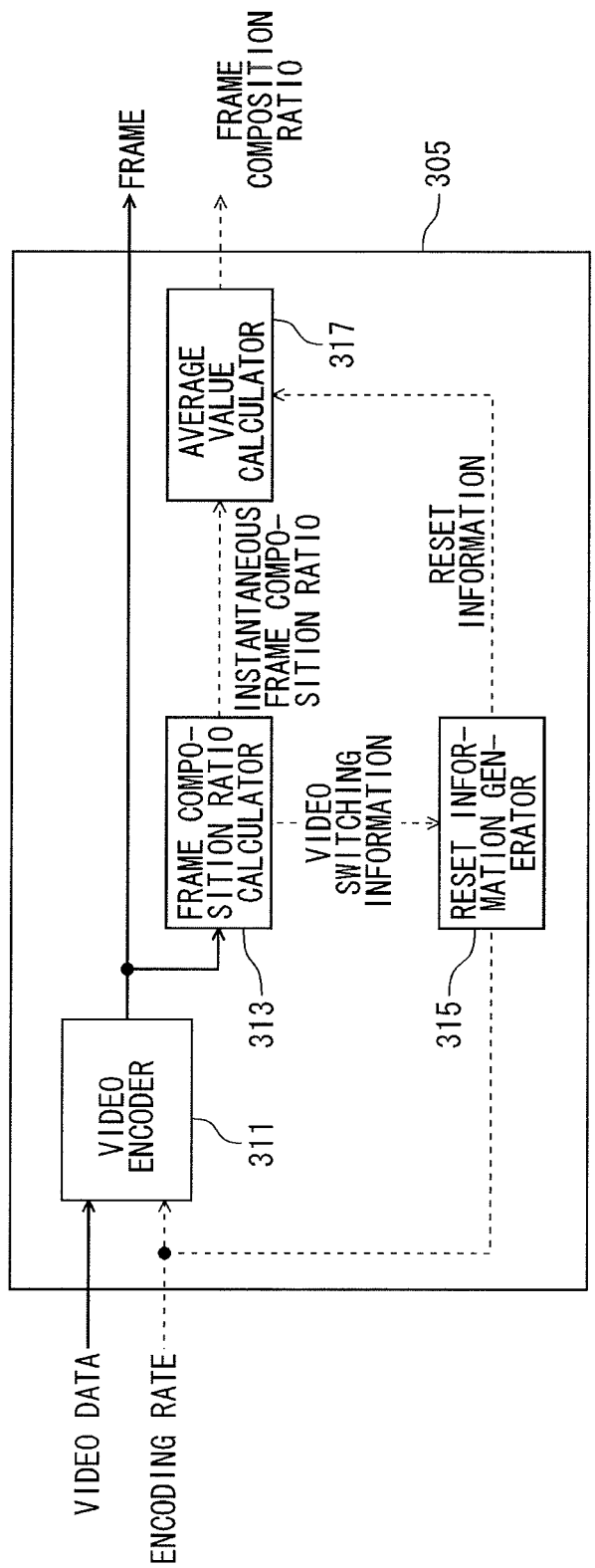
FIG. 15 is a block diagram showing the internal configuration of an encoder 305 provided in the transmission terminal of the third embodiment.

FIG. 15 is a block diagram showing the internal configuration of the encoder 305 provided in the transmission terminal of the third embodiment. As shown in FIG. 15, the encoder 305 of the present embodiment includes a video encoder 311, a frame composition ratio calculator 313, a reset information generator 315, and an average value calculator 317.

The video encoder 311 performs compression encoding of video data at the encoding rate notified from the bandwidth estimator 103, and outputs the result as a frame. The video encoder 311 can generate frame rate information or CODEC information including the number of I frames, the number of P frames, the I frame information amount, and the P frame information amount with reference to the frame of the encoding result.

The frame composition ratio calculator 313 calculates an instantaneous frame composition ratio from the I frame information amount and the P frame information amount with reference to the frame of the encoding result. Assuming that the I frame information amount is $I_{info}$ [byte] and the P frame information amount is $P_{info}$ [byte], the instantaneous frame composition ratio $FR_{isnt}$ is calculated from the calculation expression of "$FR_{isnt}=I_{info}/P_{info}$". The instantaneous frame composition ratio calculated by the frame composition ratio calculator 313 is input to the average value calculator 317. In addition, the frame composition ratio calculator 313 detects a scene change from a change in Group Of Picture (GOP) information indicating the frame structure, such as the number of I frames or the number of P frames, and outputs video change information based on the detection result to the reset information generator 315.

The reset information generator 315 generates reset information when video switching information indicating whether or not the encoding rate has been changed by a predetermined value or more is input, and inputs the reset information to the average value calculator 317.

The average value calculator 317 accumulates the instantaneous frame composition ratio $FR_{isnt}$, which is output every video encoding unit, for a predetermined time, calculates the average value, and outputs the average value as a frame composition ratio. Until the average value of the instantaneous frame composition ratio $FR_{isnt}$ is output or when the reset information is input, the average value calculator 317 outputs an initial value set in advance as the frame composition ratio. In addition, assuming that the number of samples of instantaneous values for calculating the average value is $N_s$, the frame composition ratio $FR_{ave}$ is calculated from Expression (13).

[Expression 13]

$$FR_{ave} = \frac{1}{N_s} \sum_{i=1}^{N_s} FR_{inst}(i) \qquad (13)$$

Figure 16:
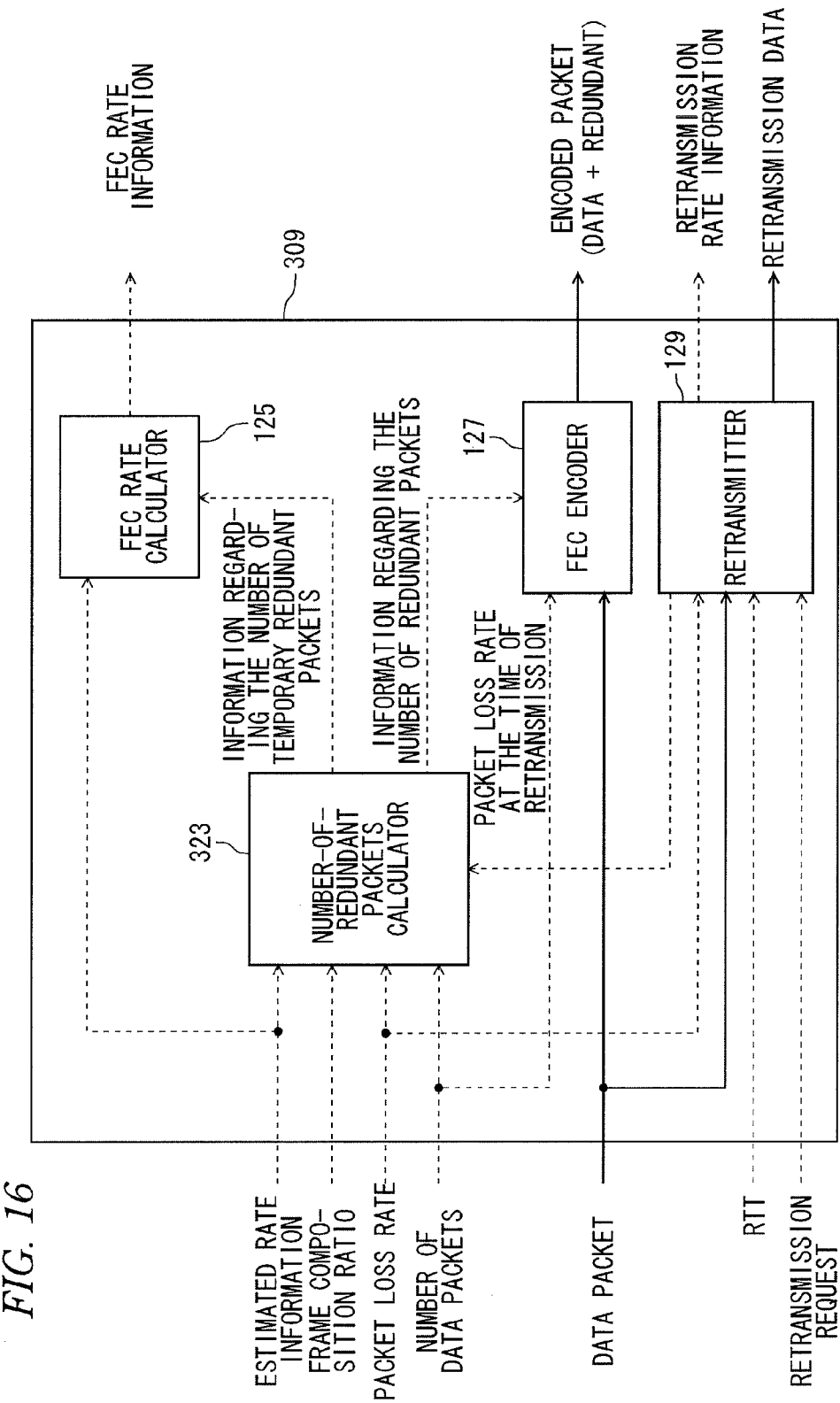
FIG. 16 is a block diagram showing the internal configuration of a retransmission/FEC unit 309 provided in the transmission terminal of the third embodiment.
Figure 20:
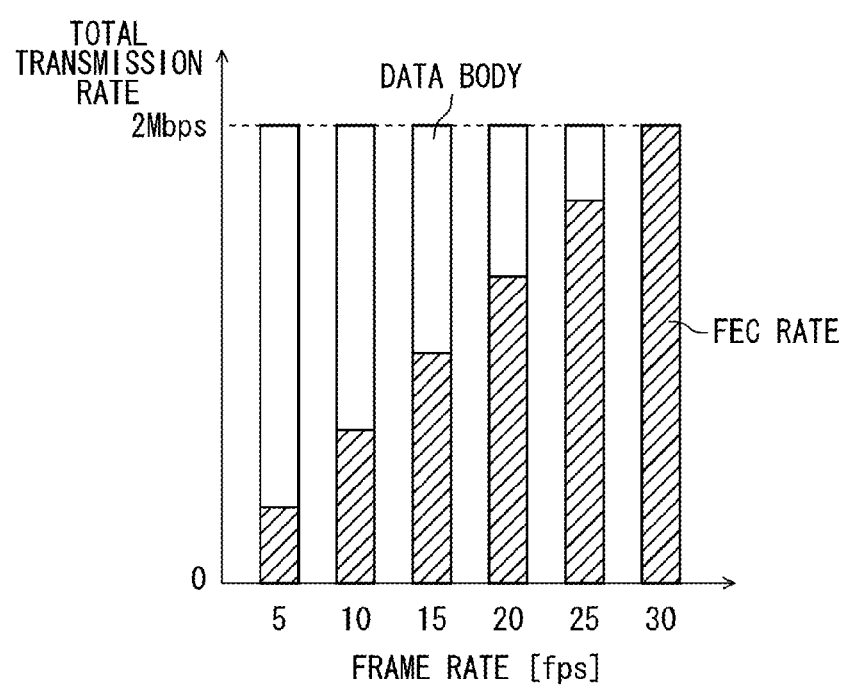
FIG. 20 is a diagram showing the ratio of the FEC rate to the total transmission rate for each frame rate of a video.
Figure 21:
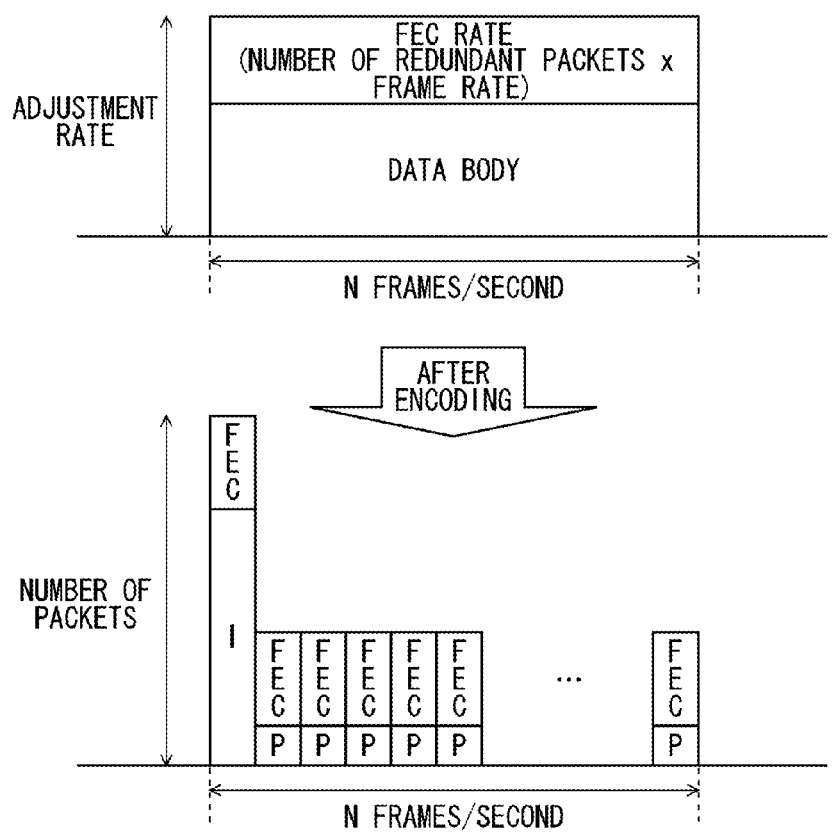
FIG. 21 shows the addition of a redundant (FEC) packet to a frame after encoding.

FIG. 16 is a block diagram showing the internal configuration of the retransmission/FEC unit 309 provided in the transmission terminal of the third embodiment. As shown in FIG. 16, the retransmission/FEC unit 309 of the present embodiment does not have the frame composition ratio predictor 121, and the operation of the number-of-redundant packets calculator 323 is different from the operation of the number-of-redundant packets calculator 123 of the first embodiment. That is, the number-of-redundant packets calculator 323 of the present embodiment is different from the number-of-redundant packets calculator 123 of the first embodiment in that the number of temporary redundant packets is calculated using the frame composition ratio notified from the encoder 305.

First, a method of calculating the number of temporary redundant packets in the present embodiment will be described. Assuming that the frame composition ratio notified from the encoder 305 is $FR_{ave}$, estimated transmission rate information is R [Mbps], and the data size of one packet is S [byte], the total number of packets of P frame $P_{packet}$ and the total number of packets of I frame $I_{packet}$ are calculated from Expressions (14P) and (14I), respectively.

[Expression 14]

$$P_{packet} = 10^6 R \cdot \left(\frac{1}{1+FR_{ave}}\right) / 8S \qquad (14P)$$

$$I_{packet} = 10^6 R \cdot \left(\frac{FR_{ave}}{1+FR_{ave}}\right) / 8S \qquad (14I)$$

The number of temporary redundant packets $L_{opt\_temp}$ is calculated by substituting the total number of packets of P frame P packet and the total number of packets of I frame $I_{packet}$ of Expressions (14P) and (14I) into Expression (7) described in the first embodiment. The method of calculating the number of redundant packets is the same as that in the first embodiment.

As described above, in the present embodiment, since it is possible to improve the prediction accuracy by using the actual encoding result for the prediction of the frame composition ratio, an appropriate number of redundant packets are added to each of the I and P frames. As a result, it is possible to further improve the reproduction quality of video data at the reception terminal in a packet loss environment while suppressing the data rate of redundant packets. In addition, since it is possible to cope with scene changes, it is possible to prevent the degradation of the prediction accuracy.

Although the case where the present disclosure is implemented by hardware has been described as an example in each of the above embodiments, the present disclosure may also be implemented by software in conjunction with the hardware.

In addition, each functional block used in the description of each of the above embodiments can be implemented as an LSI, which is an integrated circuit, typically. Each functional block may be individually formed as one chip, or some or all of the functional blocks may be formed as one chip. Although the LSI is applied herein, the chip may also be referred to as an IC, a system LSI, a super LSI, and an ultra LSI depending on the degree of integration.

In addition, the method of circuit integration is not limited to the LSI, and may also be realized using a dedicated circuit or a general-purpose processor. After manufacturing the LSI, it is also possible to use a reconfigurable processor that can reconfigure connections or setting of circuit cells inside the LSI or a Field Programmable Gate Array (FPGA) that can be programmed.

In addition, when circuit integration technology to replace the LSI appears due to the advancement of semiconductor technology or another technology obtained from the semiconductor technology, it is also naturally possible to integrate functional blocks using the technology. Applications of biotechnology and the like are possible.

While the present disclosure has been described in detail with reference to the specific embodiments, it is apparent to those skilled in the art that various changes and modifications may be made without departing from the spirit and scope of the present disclosure.

This application is based on Japanese Patent Application No. 2011-212916 filed on Sep. 28, 2011, the contents of which are incorporated herein by reference.

INDUSTRIAL APPLICABILITY

The data processing device according to the present disclosure is useful as a transmission terminal of a video transmission system that transmits data packets of video data together with an appropriate number of redundant packets added thereto.

REFERENCE SIGNS LIST

101: RTCP receiver
103: bandwidth estimator
105, 305: encoder
107: packetizer
109, 209, 309: retransmission/FEC unit
111: RTP transmitter
121: frame composition ratio predictor
123, 323: number-of-redundant packets calculator
125: predicted FEC rate calculator
127: FEC encoder
129: retransmitter
151: RTP receiver
153: packet loss detector
155: feedback packet generator
157: retransmission determination unit
159: packet loss recovery unit
161: depacketizer
163: decoder
165: RTCP transmitter
201: prediction result comparator
311: video encoder
313: frame composition ratio calculator
315: reset information generator
317: average value calculator

The invention claimed is:

1. A data processing device for processing video data transmitted through a wireless network, the data processing device comprising:
 a bandwidth estimator, configured to estimate a transmission rate of the wireless network;
 a frame composition ratio obtaining unit, configured to obtain a frame composition ratio that indicates a ratio between I frames using intra-frame encoding and P frames using inter-frame predictive encoding, the I and P frames forming a video;
 a temporary redundant packet rate calculator, configured to calculate a number of temporary redundant packets based on the frame composition ratio and the transmission rate estimated by the bandwidth estimator and to calculate a temporary redundant packet rate from the transmission rate and the number of temporary redundant packets;
 an encoding rate calculator, configured to calculate an encoding rate for encoding the video data from the transmission rate and the temporary redundant packet rate;
 a video data processor, configured to encode the video data at the encoding rate and packetize the encoded video data; and
 a redundant encoding processor, configured to calculate a number of redundant packets to be added to each frame, which is obtained as a result of processing in the video data processor, and to add redundant packets to each frame, wherein the redundant packets are obtained by performing redundant encoding processing on data packets of the encoded video data.

2. The data processing device according to claim 1, wherein
 the frame composition ratio obtaining unit obtains the frame composition ratio based on the transmission rate estimated by the bandwidth estimator and a frame rate of the video.

3. The data processing device according to claim 2, wherein
 the frame composition ratio obtaining unit obtains a frame composition ratio that minimizes a ratio of the temporary redundant packet rate with respect to the transmission rate.

4. The data processing device according to claim 2, comprising:
 a comparator, configured to compare a number of data packets of each frame of the video obtained as an encoding result of the video data processor with a number of data packets of each frame obtained from the transmission rate and the frame composition ratio obtained by the frame composition ratio obtaining unit, wherein
 the temporary redundant packet rate calculator adjusts the frame composition ratio depending on a comparison result of the comparator.

5. The data processing device according to claim 1, wherein
 the frame composition ratio is an average value of frame composition ratios calculated from past encoding results of the video data.

6. The data processing device according to claim 1, wherein
 the frame composition ratio obtaining unit calculates a number of packets, which is transmittable per unit time at the transmission rate, based on the transmission rate and a data size of one packet.

7. A data processing method for processing video data transmitted through a wireless network, the data processing method comprising:
 a bandwidth estimation step of estimating a transmission rate of the wireless network;
 a frame composition ratio obtaining step of obtaining a frame composition ratio that indicates a ratio between I frames using intra-frame encoding and P frames using inter-frame predictive encoding, the I and P frames forming a video;
 a temporary redundant packet rate calculation step of calculating a number of temporary redundant packets based on the frame composition ratio and the transmission rate estimated in the bandwidth estimation step and calculating a temporary redundant packet rate from the transmission rate and the number of temporary redundant packets;
 an encoding rate calculation step of calculating an encoding rate for encoding the video data from the transmission rate and the temporary redundant packet rate;
 a video data processing step of encoding the video data at the encoding rate and packetizing the encoded video data; and
 a redundant encoding processing step of calculating a number of redundant packets to be added to each frame, which is obtained as a result of the processing in the video data processing step, and adding redundant packets to each frame, wherein the redundant packets are obtained by performing redundant encoding processing on data packets of the encoded video data.

8. The data processing method according to claim 7, wherein
 the frame composition ratio obtaining step includes obtaining the frame composition ratio based on the transmission rate estimated in the bandwidth estimation step and a frame rate of the video.

9. The data processing method according to claim 8, wherein
 the frame composition ratio obtaining step includes obtaining a frame composition ratio that minimizes a ratio of the temporary redundant packet rate with respect to the transmission rate.

10. The data processing method according to claim 8, further comprising:
 a comparison step of comparing a number of data packets of each frame of the video obtained as an encoding result in the video data processing step with a number of data packets of each frame obtained from the transmission rate and the frame composition ratio obtained in the frame composition ratio obtaining step, wherein
 the temporary redundant packet rate calculation step includes adjusting the frame composition ratio depending on a comparison result in the comparison step.

11. The data processing device according to claim 7, wherein
 the frame composition ratio is an average value of frame composition ratios calculated from past encoding results of the video data.

12. The data processing method according to claim 7, wherein
 the frame composition ratio obtaining step includes calculating a number of packets, which is transmittable per unit time at the transmission rate, based on the transmission rate and a data size of one packet.

* * * * *